United States Patent [19]

Banker et al.

[11] Patent Number: 5,497,187
[45] Date of Patent: Mar. 5, 1996

[54] IN-BAND/OUT-OF-BAND DATA TRANSMISSION METHOD AND APPARATUS FOR A TELEVISION SYSTEM

[75] Inventors: Robert O. Banker, Cumming; Steven R. Yothment, Lawrenceville, both of Ga.

[73] Assignee: Scientific-Atlanta, Inc., Norcross, Ga.

[21] Appl. No.: 361,465

[22] Filed: Dec. 22, 1994

Related U.S. Application Data

[63] Continuation of Ser. No. 983,766, Dec. 1, 1992, abandoned, which is a continuation-in-part of Ser. No. 799,987, Nov. 29, 1991, Pat. No. 5,317,391, Ser. No. 800,002, Nov. 29, 1991, Pat. No. 5,301,028, Ser. No. 800,241, Nov. 29, 1991, Pat. No. 5,247,364, and Ser. No. 800,836, Nov. 29, 1991.

[51] Int. Cl.⁶ .......................... H04N 7/10; H04N 7/087; H04N 7/025; H04N 7/06
[52] U.S. Cl. ................................. 348/6; 348/478
[58] Field of Search .................... 348/6–14, 17, 348/1, 478, 479, 477, 476, 474, 473, 482, 484, 483, 485, 729, 461, 468; 455/4.1, 6.1, 6.2, 3.1; 380/10, 15, 17, 20; H04N 7/06, 7/08, 7/087, 7/093, 7/10, 7/03, 7/025

[56] References Cited

U.S. PATENT DOCUMENTS

| | | | |
|---|---|---|---|
| 4,319,273 | 3/1982 | Nossem | 358/120 |
| 4,536,791 | 8/1985 | Campbell et al. | 358/86 |
| 4,553,161 | 11/1985 | Citta | 348/10 |
| 4,567,517 | 1/1986 | Mobley | 358/120 |
| 4,618,888 | 10/1986 | Nohara et al. | 380/15 |
| 4,815,129 | 3/1989 | Griffin et al. | 380/15 |
| 4,890,319 | 12/1989 | Seth-Smith et al. | 380/5 |
| 4,924,498 | 5/1990 | Farmer et al. | 380/15 |
| 4,991,011 | 2/1991 | Johnson et al. | 358/141 |
| 4,994,908 | 2/1991 | Kuban et al. | 358/86 |
| 5,054,071 | 10/1991 | Bacon | 381/12 |
| 5,058,160 | 10/1991 | Banker et al. | 380/20 |
| 5,091,938 | 2/1992 | Thompson et al. | 380/21 |
| 5,140,420 | 8/1992 | Hurst | 358/147 |
| 5,161,187 | 11/1992 | Kajita et al. | 380/15 |
| 5,247,364 | 9/1993 | Banker et al. | 348/569 |
| 5,257,396 | 10/1993 | Auld, Jr. et al. | 455/2 |
| 5,301,028 | 4/1994 | Banker et al. | 348/570 |
| 5,317,391 | 5/1994 | Banker et al. | 348/6 |

FOREIGN PATENT DOCUMENTS

| | | | |
|---|---|---|---|
| 1147604 | 4/1969 | United Kingdom | H04U 7/08 |
| 8910664 | 11/1989 | WIPO | H04N 7/10 |

OTHER PUBLICATIONS

47 C.F.R. § 73.699 (FCC, Oct. 1, 1991 ed.).

*Primary Examiner*—Victor R. Kostak
*Assistant Examiner*—Safet Metjahic
*Attorney, Agent, or Firm*—Banner & Allegretti, Ltd.

[57] ABSTRACT

Data transmission for a cable television system includes transmitting data via a plurality of signals including, but not limited to, in-band audio, in-band video, and out-of-band signals. The in-band data signals are transmitted on scrambled or non-scrambled channels. In-band video data transmission further includes selecting certain lines of the vertical blanking interval for in-band video data transmission, omitting certain equalizing pulses during the selected lines and inserting in-band video data during the selected lines. The several data signals, in-band and out-of-band, have compatible transaction formats to facilitate decoding and data storage processes at a subscriber terminal of the cable television system. A data transmission apparatus includes a data inserter for inserting in-band data in non-scrambled channels, an addressable data transmitter for transmitting out-of-band data and a scrambler for inserting data in scrambled channels.

7 Claims, 10 Drawing Sheets

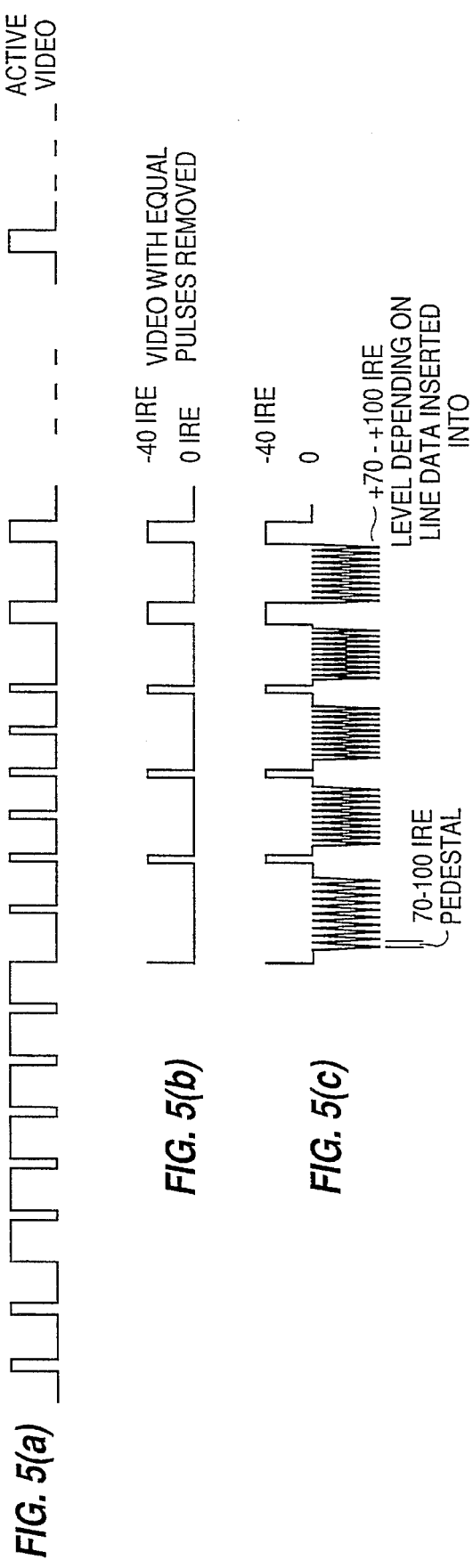

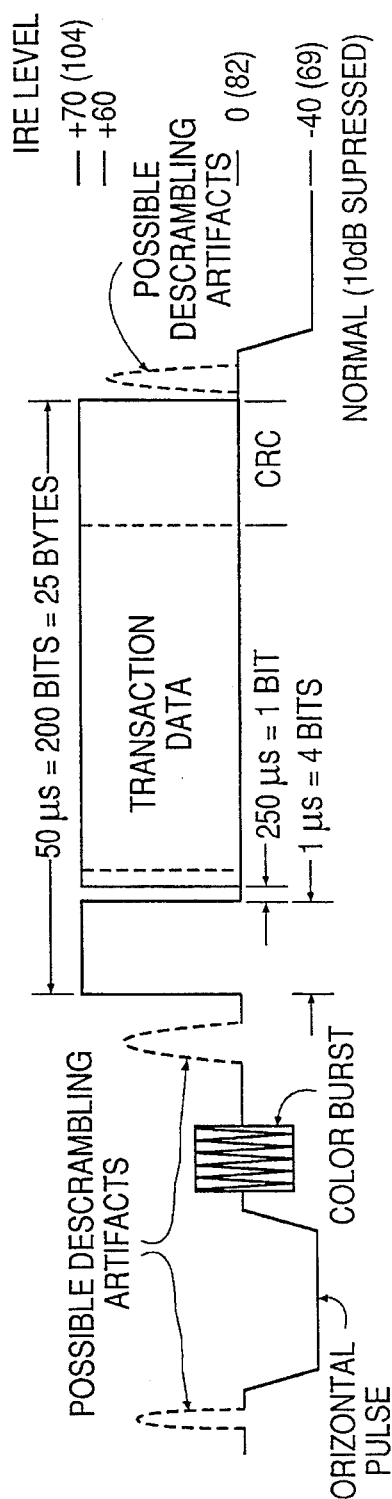
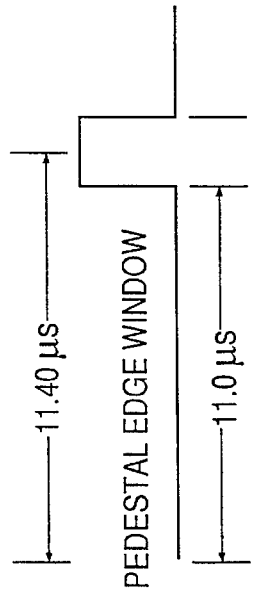
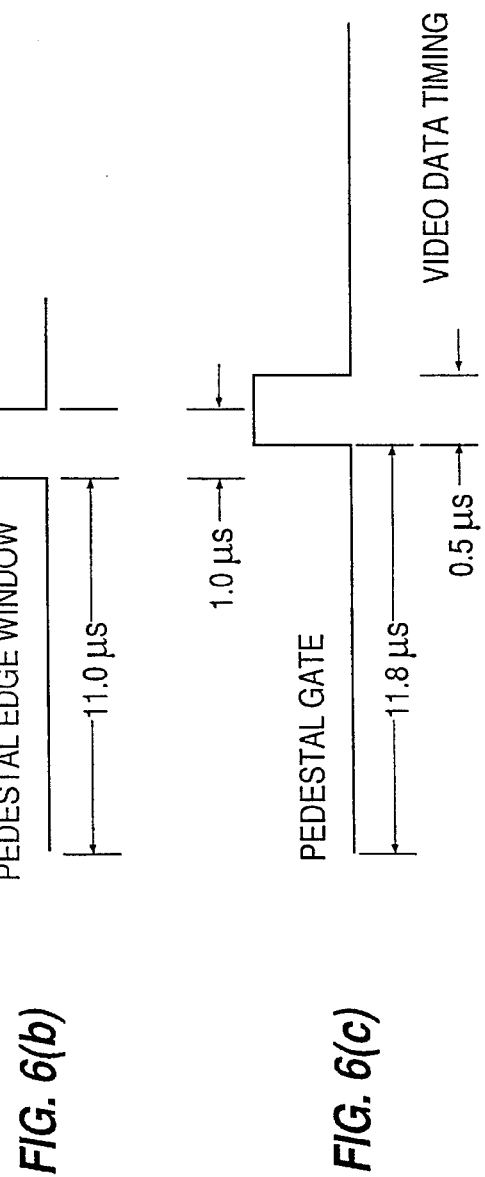
FIG. 6(a)
FIG. 6(b)
FIG. 6(c)

FIG. 7

|  | IN BAND VIDEO | IN BAND AUDIO | OUT-OF-BAND |
|---|---|---|---|
| TYPE A TRANSACTION |  |  |  |
| NUMBER OF BYTES | 8-24 BYTES | 8-24 | 8-24 |
| PEDESTAL | YES | NO | NO |
| PREAMBLE | YES | YES | YES |
| TIME/ADDRESS | YES | YES | YES |
| TRANSACTION CODE | YES | YES | YES |
| DATA | YES | YES | YES |
| ERROR DETECTION/ CORRECTION | YES | YES | YES |
| FIELD FLAG | NO | YES | NO |
| BITS HIGH CHECK | NO | YES | NO |
| SCRAMBLING MODE | YES | YES | NO |
| TYPE B TRANSACTION |  |  |  |
| NUMBER OF BYTES | 12-36 BYTES | 12-36 BYTES | 12-36 BYTES |
| TYPE C TRANSACTION |  |  |  |
| NUMBER OF BYTES | 16-48 BYTES | 16-48 BYTES | 16-48 BYTES |
| TYPE D TRANSACTION |  |  |  |
| NUMBER OF BYTES | 24-72 BYTES | 24-72 BYTES | 24-72 BYTES |
| TYPE E TRANSACTION |  |  |  |
| NUMBER OF BYTES | 64-192 | POSSIBLE IF NONTIMING DATA IS AT A BIT RATE ABOVE APPROXIMATELY 230 BITS PER FIELD | 64-192 BYTES |

IN-BAND/OUT-OF-BAND DATA TRANSMISSION METHOD AND APPARATUS FOR A TELEVISION SYSTEM

This application is a continuation, of application Ser. No. 07/983,766, filed Dec. 1, 1992, now abandoned, which application is a continuation-in-part of U.S. applications Ser. Nos. 799,987, now U.S. Pat. No. 5,317,391; 800,241, now U.S. Pat. No. 5,301,028; 800,241, now U.S. Pat. No. 5,247,364; and 800,836 all of which were filed Nov. 29, 1991. This invention relates to the field of television systems and, more particularly, to a method and apparatus for communicating data, including messages and commands, to signal distribution apparatus and terminals of a cable television system via in-band and out-of-band data signals.

BACKGROUND OF THE INVENTION

1. Technical Field

2. Description of the Relevant Art

Cable, satellite and over-the-air broadcast and subscription television systems, generally referred to herein as television systems, have been known since the 1970's which involve the transmission of addressed data to terminals on a carrier signal or subcarrier of a broadcast signal. In cable television systems in particular, a data carrier is chosen to be outside of the bandwidth of the transmission of a multiplexed frequency spectrum of television channels (an out-of-band carrier). The out-of-band carrier, for example, is chosen, for example, to be near the FM radio channel band, such as at 108.2 MHz, and the addressable data is, for example, frequency shift key modulated on the out-of-band carrier. The data typically comprises an address field and a data or message field. If the address matches the address of the apparatus to which it is directed, then, the data field is accepted by the apparatus. The data of the data field may command the apparatus in some way and, in particular, may contain command data or an operand, sometimes referred to as a transaction code, and other data to be operated on by the command. Some data fields are global in nature and maybe accepted by all receiver apparatus. Other data fields are uniquely addressed to either a selected group of terminals, one terminal location which may have a plurality of terminals or to one terminal.

With the passage of time, cable television systems have become more complex. The signal distribution apparatus may comprise amplifiers which may be controlled by the addressed data transmitted from the headend of a cable television system. The gain and equalization provided by such apparatus may be automatically controlled from the headend. Likewise, tap apparatus which may, for example, comprise interdiction, trap or other signal denial apparatus may be controlled by addressable command from the headend. The terminal apparatus, also, which may, for example, comprise signal descrambling apparatus, may be controlled by addressable command.

The need for greater communications capacity to control the several apparatus forms and variety of services that can be controlled from a headend has precipitated a requirement to transmit addressed and even non-addressed data from a headend by other means. One alternative system that has been developed is to utilize the sound carrier, which accompanies a video carrier, together comprising a single video channel. For example, the sound carrier may be amplitude modulated with data that accompanies a channel. The data may not be addressed data. The data sent on the sound carrier may be utilized, for example, as a channel or program identifier to identify the accompanying video or program content. On the other hand, the data may comprise addressed data to supplement or replace the out-of-band data transmission of addressed data. This in-band audio data transmission is controlled by a known in-band data controller, sometimes referred to as a headend controller, in a manner so that a system control computer utilizes both in-band and out of band data transmission to advantage. For example, immediate commands of importance to signal distribution or terminal apparatus are transmitted immediately and less immediately required data is transmitted on a less frequent basis. Such a headend controller and system is particularly described by U.S. Pat. No. 5,058,160, incorporated herein by reference. The in-band audio data rate, however, may be slow and may be at a rate only approximating the line rate or 15,734 bits per second.

One other problem with in-band audio data communication over the sound carrier of a video channel is that the data is typically inserted into only premium channels by a television signal scrambler, also referred to herein as an encoder. In other words, the data receiver of terminal apparatus must be tuned to a scrambled channel in order for the data receiver to receive the in-band audio data transmission. An in-band audio data receiver of a cable television terminal capable of displaying channel identification information is described in pending U.S. application Ser. No. 07/800,002, filed Nov. 29, 1991 and incorporated herein by reference.

With the advent of so-called on screen display of data accompanying a particular channel, for example, a channel program guide for the viewed channel, there has been a related need to increase the data carrying capacity of the channel. For example, it is desirable to turn to a particular cable television channel and, by remote control, cause a display of the program guide for the evening's entertainment on that channel, in stead of the program content for a period of time, with accompanying program audio or other audio content. A television terminal with programmable background audio and video is described in U.S. Pat. No. 4,991,011, incorporated herein by reference.

Also, there is a great need to provide new and additional services over the cable television network. These services include telecommunications, both voice and data, captioning, teletext, facsimile, digital audio, video game and computer software downloading. All of these services will require greatly increased utilization of the available cable television spectrum.

It is now proposed that over-the-air broadcast programs carry captioning data on one of the lines of the vertical blanking interval. It has also been long required that lines of the vertical blanking interval be reserved for certain test purposes. Also, in Europe, it has been known for some time to provide teletext services on certain lines of the vertical blanking interval. Consequently, it has been generally known for some time to transmit in band video data in the vertical blanking interval of a baseband video signal of a television system.

With the increased data carrying capacity requirement, there is a requirement to remain compatible with existing in-band and out-of-band data carrying schemes so that a cable television system operator need not replace their existing cable distribution and terminal apparatus which is a great capital investment. Consequently, there remains a problem in the cable television industry to greatly increase the data throughput from a headend through the signal distribution plant.

II. SUMMARY OF THE INVENTION

The problems and related problems of known cable television data transmission arrangements are solved by the principles of the present invention which has the following objects:

It is an object of the present invention to identify and to utilize an additional means of data transmission from a headend. This additional means may include, and not be limited to, the utilization of portions of the vertical blanking interval of the video picture signal.

It is a further object of the present invention to remain compatible with existing signal distribution and terminal apparatus. Consequently, existing services and features of known cable television systems will be provided in known manner or, at least, in a manner which is not a significant variant from known techniques which would require considerable terminal modification or even replacement.

It is a further object of the present invention to utilize the additional means of data transmission for new and additional services. These new services may include the delivery of telecommunications, both audio and video, program channel guide and other services, some of which have already been enumerated above.

It is a further object of the present invention, to the extent possible, to make out-of-band and in-band transmission schemes similarly simple to decode so that software storage capacity at terminal or signal distribution apparatus is minimized and the storage of received data facilitated. To meet this object, the data may be transmitted in similar length packets comprising a number of bytes M, an even number between 8 and 24 or N, an even number of bytes between 12 and 36. Then, simple transactions or messages may comprise M or N bytes and more complex transactions or messages may comprise from 2M to 8N bytes in length. The transactions may be, then, of several types depending on their length which may be most simply designated A, B, C, D, E . . . and so on as necessary but maintain a commonality determined by the packet parameters M and/or N and/or 2. Once formatted into transactions, the data may be transmitted over any one of provided in-band audio, in-band video or out-of-band data channels.

In keeping with the objects of the present invention, in-band and out-of-band data transmission is utilized to greatly increase the data throughput from a headend to signal distribution apparatus or to a terminal. The vertical blanking interval, to the extent it is not utilized for required services such as captioning, is utilized for the transmission of high data throughput services such as program channel guides which require frequent and periodic update. The transmission via the vertical blanking interval is suggested to be at a data rate on the order of a known teletext data rate at 5.7 megabits per second. Out-of-band transactions are utilized to update terminal memory and to control signal distribution apparatus in known manner. However, as described above, a commonality is suggested according to the principles of the present invention for data transmission schemes for any of the three forms of data transmission: in-band audio, in-band video and out-of-band.

According to the principles of the present invention and for in-band video data, a pedestal is provided, for example, at a selectable 70, 80 or 100 IRE level, and, then, an in-band video data receiver data slices in the vertical blanking interval signal at half the chosen pedestal level. Through analog and digital circuitry of the in-band video or vertical blanking interval data receiver, the circuitry determines the location of the vertical blanking interval and the form of the data expected to appear on a given line. An addressed out-of-band or in-band audio data transaction may be utilized to establish the capabilities of given terminal apparatus to decode particular lines. For example, lines 10–12 may be coded in one form, lines 13–16 in another form, and so on until line 21, which is reserved for passed through captioning (while another line may provide captioning in a second language according to the principles of the present invention). In an alternative embodiment, the pattern of the in-band video data may be utilized for its recovery and recognition. The requirement for predisposition of the terminal to receive data from predetermined lines is thus avoided. In either embodiment, the captioning signals and other signals that are required to be forwarded toward the television receiver will not be decoded by the signal distribution or terminal apparatus according to the present invention or otherwise disturbed from being received by the television receiver.

In one preferred embodiment, lines 7, 8 and 9 of the vertical blanking interval of the picture signal may be utilized to transmit in-band video data for, for example, descrambler control or for new services. These lines are normally utilized for transmitting equalizing pulses after serrated synch pulses signifying the vertical synchronizing pulse. According to the present invention, the in-band video data, transmitted with certain of the equalizing pulses removed, will be stripped off the incoming video signal at an in-band video data receiver to meet a requirement that no signals above 0 IRE be transmitted on these lines to the television receiver. Furthermore, the receiver automatically replaces any removed equalizing pulses.

The form of in-band video data for descrambling control may comprise, for example, selection data for selecting one of a plurality of modes of descrambling, such as video inversion, synch inversion, gated synch suppression at varying levels, video line shuffling, sine wave suppression or any of the other well known means of scrambling. Another form of descrambling control data comprises timing data, that is, when is a particular form of descrambling to begin and end. A flag, for example, may be utilized in the vertical blanking interval to say "start" and to define a descrambling mode window, for example, a number of fields, or, in another embodiment, the start of a particular form of descrambling may be defined by one flag and the end of the particular form of descrambling by another. Other features of the present invention described herein include the utilization of a field flag to denote odd/even field and time of day. Other utilization of the in-band video data transmission may include, but not be limited to include any of the enumerated services described above such as program channel guide, teletext, facsimile, telecommunications and so on.

If all six equalizing pulses present at lines 7, 8 and 9 are removed, then, a terminal according to the present invention may regenerate the removed equalizing pulses, which are required to be passed to the television receiver. By removal of all the equalizing pulses, practically a 200 microsecond data window is provided, (three lines×63.5 microseconds/line in an NTSC standard video waveform) beginning after the last serrated synch pulse and concluding with the first full width horizontal pulse at line 10. In another embodiment, the three equalizing pulses of lines 7, 8 and 9 appearing in synch with horizontal pulses will not be removed; only the three equalizing pulses appearing between these are removed. Even in this embodiment, the available data window is only reduced by approximately 10 microseconds.

Preferably, each line of vertical blanking interval utilized for in-band video data transmission comprises at least a fifty microsecond data window for transmitting 25 four bit bytes. The data may include, for example, a one byte pedestal of one microsecond duration to provide a data slicing level for bipolar data detection and evaluation.

Consequently, an in-band video data inserter according to the present invention modifies the normal television synchronization signal and may conveniently comprise a portion of a television scrambler or a cable television modulator or comprise a separate integral element. An in-band data inserter was first described in the afore-mentioned U.S. application Ser. No. 07/800,002 filed Nov. 29, 1991 for providing in-band audio data transmission on non-scrambled channels. According to the principles of the present invention, an in-band data inserter for non-premium channels may provide either in-band audio or in-band video data insertion; then, an in-band receiver need not be tuned to only scrambled television channels to receive in-band video data.

One connected to the cable television distribution plant via a pirate terminal, which is not equipped to regenerate equalizing pulses, will receive a signal on any channel carrying in-band video data, regardless of whether it is scrambled, that is not in accordance with NTSC broadcast signal standards. The intentionally degraded picture signal may result in some vertical distortion on some television receivers. This is an advantage in discouraging signal piracy.

Also, according to the principles of the present invention, new services are transmitted over the vertical blanking interval of the video signal while known services are provided over the sound carrier (in-band audio) or via an out-of-band data carrier. A cable television operator may utilize and program delivery of data services in accordance with the present invention any way they choose, by automatically predetermining through system control computer and headend controller processes how both sound carrier and baseband video blanking interval forms of in-band and out-of-band data transmission be carried out.

These and other principles of the present invention will be best understood through the following description of the accompanying drawings.

BRIEF DESCRIPTION OF THE DRAWINGS

FIG. 5 shows television signal waveforms for transmission of in-band video data during the vertical blanking interval of the television picture signal; FIG. 5a showing a standard television signal; FIG. 5b showing, by way of example, equalizing pulses removed at lines 7, 8 and 9; and FIG. 5c showing data inserted at lines 7, 8, and 9; and FIGS. 6(a), 6(b), and 6(c) show television signal waveforms utilized in conjunction with FIGS. 4a and 4b in recovering in-band video data.

FIG. 7 is a table showing a proposed data transaction packet scheme for transmitting data via each of three signals, in-band video data, in-band audio data, and out-of-band data, the data packet schemes being as compatible as possible to promote decoding and data storage efficiency.

DETAILED DESCRIPTION OF THE DRAWINGS

Figure 1:
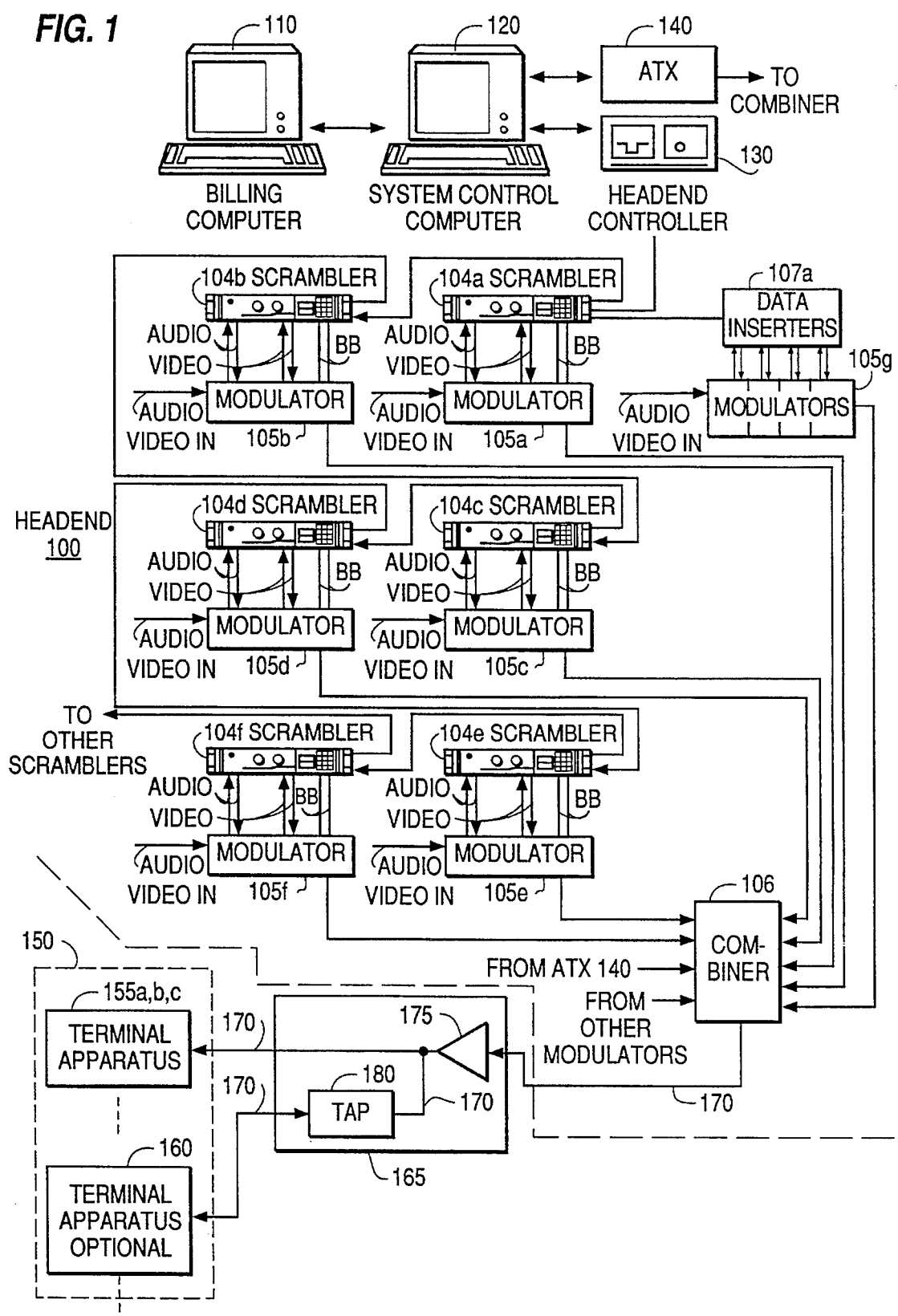
FIG. 1 is a block schematic diagram of a cable television system incorporating the principles of the present invention comprising a headend, signal distribution apparatus and subscriber terminal apparatus.

Referring now to FIG. 1, there is shown a headend 100 coupled to signal distribution apparatus 165, the signal distribution apparatus for distributing signals from headend 100 to terminal apparatus 150 of a cable television system. While a cable television system is shown and described, several of the principles of the present invention may be equally applied in a satellite, over-the-air broadcast, subscription television system or other television system known in the art. Headend 100 is shown as comprising all elements above the dashed line separating signal combiner 106 from distribution apparatus 165 and terminal apparatus 150. Headend 100 equipment need not all be located at one site, but may be located at several sites controlled by the site where at least the system control computer 120 is located. The headend 100 of a cable television system receives a plurality of television channel signals and other sources of program content, which may include video games or digital audio, or even telecommunications signals which become inputs to modulators, signal processors and such of a headend 100. The input video channels to modulators 105a–105g are denoted "Audio+Video In." There are also shown a number of connections between each modulator 105a –105g and scramblers 104a–104f and data inserters 107a and so on. These are denoted in FIG. 1 by the "audio", "video" and baseband "BB" labels associated with the connecting lines. The receivers for receiving the various services are not shown but may include satellite signal reception, video broadcast reception or telecommunications receivers. The headend then formats and transmits the various services over the available cable television spectrum for delivery to subscriber locations 150. The services are delivered via cable 170 which may be coaxial or optical fiber which comprises a portion of signal distribution apparatus 165 and connects, for example, signal combiner 106 to apparatus 175 and apparatus 175 to terminal apparatus 155a,b,c or tap 180. Amplifiers, equalizers, couplers, taps and other signal distribution apparatus to deliver the signal to the proximity of the subscriber's premises 150 are generally shown as apparatus 175. Also shown in signal distribution block 165 is tap 180 which generally refers to known types of signal distribution apparatus proximate to the subscriber's premises 150 which may comprise, for example, signal denial apparatus such as addressable taps, traps, or interdiction apparatus. Either form of signal distribution apparatus 175, 180 may be remotely addressed from headend 100 via an out-of-band transaction from addressable transmitter 140. Signal distribution apparatus 165 is generally not equipped to receive in-band data transmissions. Consequently, all communications, regardless of whether they are addressed communications or not, are transmitted to signal distribution apparatus 165 via addressable out-of-band transmitter 140.

At headend 100, there is generally a billing computer 110 and a system manager computer 120. Billing computer 110 includes a subscriber database and generates a monthly bill for the subscribers in the system based on level of service and any pay-per-view and impulse pay-per-view purchases. Billing computer 110 may comprise a personal or other data processing computer known in the art. Known billing computer systems include the products of CableData.

The system control computer 120 is interfaced to billing computer 110. The system control computer 120 may be an Intel 486 microprocessor based machine such as an IBM Model 90 equipped with a 200 megabyte hard drive running under the UNIX (R) operating system with 32 megabytes of RAM or another data processing computer known in the art. These computers are generally utilized to generate transactions for delivery to signal distribution apparatus 165 or subscriber locations 150. The billing computer 110 is especially concerned with the authorization for delivery of pay-per-view and premium services. Such authorization is translated by system control computer 120 into an out-of-band or in-band addressed data transmission to authorize the premium service delivery according to known processes. System control computer 120 receives transactions such as authorization transactions from billing computer 110 and formats and forwards transactions to headend controller 130 and addressable transmitter (ATX) 140.

The system manager computer 120, in turn, may communicate through headend controller 130 to ATX 140 over a telecommunications path. Headend controller 130 determines the control of data transmission via in-band means, either in-band audio or in-band video. Out-of-band data is properly formatted and directly delivered to addressable data transmitter 140 or via headend controller 130 which serves as a data pass through from the above-described telecommunications link, if used. Addressable data transmitter 140 modulates the data, for example, by frequency shift keying or other data modulation technique, on an out-of-band carrier, for example, at 108.2 MHz for transmission.

The headend controller 130 forwards in-band data to one of a plurality of scramblers 104a–f or, via a selected scrambler, or directly to, one or a group selected from a plurality of data inserters 107a and so on. The scramblers 104a–f operate to modulate in-band data on baseband video or on the audio carrier data channel. The scramblers interface with modulators 105a–105f or non-scrambled channel modulators 105g and so on. There may be as many scramblers 104 as there are premium scrambled channels of a system. Furthermore, a scrambler may be utilized on a non-premium channel for data insertion. By premium channel is intended a television channel utilized for the delivery of some premium charge services such as channels dedicated to certain programming such as Home Box Office or Disney or channels on which, at least some of the time, premium program events are shown, for example, pay-per-view events.

Any of a number of different scrambling schemes for scrambling a television signal are known. Details of particular scrambling operations are not described, but it is important to appreciate that a number of different systems may be utilized individually or together to scramble a signal. Each such form of scrambling is referred to herein as a scrambling mode.

The scrambler includes an in-band video channel data modulator for inserting data at selected lines of the vertical blanking interval of a baseband video picture signal and for modulating data on the sound carrier signal of a given channel as will be further described in connection with a discussion of FIG. 2.

In an alternative embodiment (not shown) addressable transmitter 140 may be connected either to headend controller 130 or to one or more scramblers 104a–f or to one or more data inserters 107a and so on. In this embodiment, headend controller 130, for example, may determine that the queue for outgoing in-band data transactions is so great that out-of-band data transmission is a more expedient mode of transmission. Consequently, headend controller 130 may signal ATX 140 to transmit one or more predetermined transactions. Preformatted data in the form of transactions according to FIG. 7 are sent over such a data path (not shown) so that the data may be immediately transmitted via an out-of-band transmitter 140. Furthermore, a scrambler or data inserter may meet with a similar full queue or other situation in which the data transaction is urgent and in-band data transmission is not available and, so, signal the out-of-band data transmitter. According to the principles of the present invention, the data transaction will be pre-formatted and capable of transmission via ATX 140 according to FIG. 7, described in detail hereinafter. Data paths for transmitting preformatted data transactions from each scrambler or data inserter to out-of-band transmitter 140 are not shown to avoid cluttering FIG. 1.

A data inserter 107a or other data inserter may be selected by addressed command from system control computer 120 via headend controller 140 for transmission of in-band audio or in-band video data on a non-scrambled channel, according to the principles of the present invention. Data reception may occur on the non-premium channel so long as the user tunes to the selected non premium channel. A non-scrambled (or scrambled) channel may be selected as a default channel to which a terminal 150 is addressably commanded to tune when not in service. The terminal will receive in-band audio or in-band video data during periods of non-use so long as the data inserter is transmitting in-band data.

Figure 4:
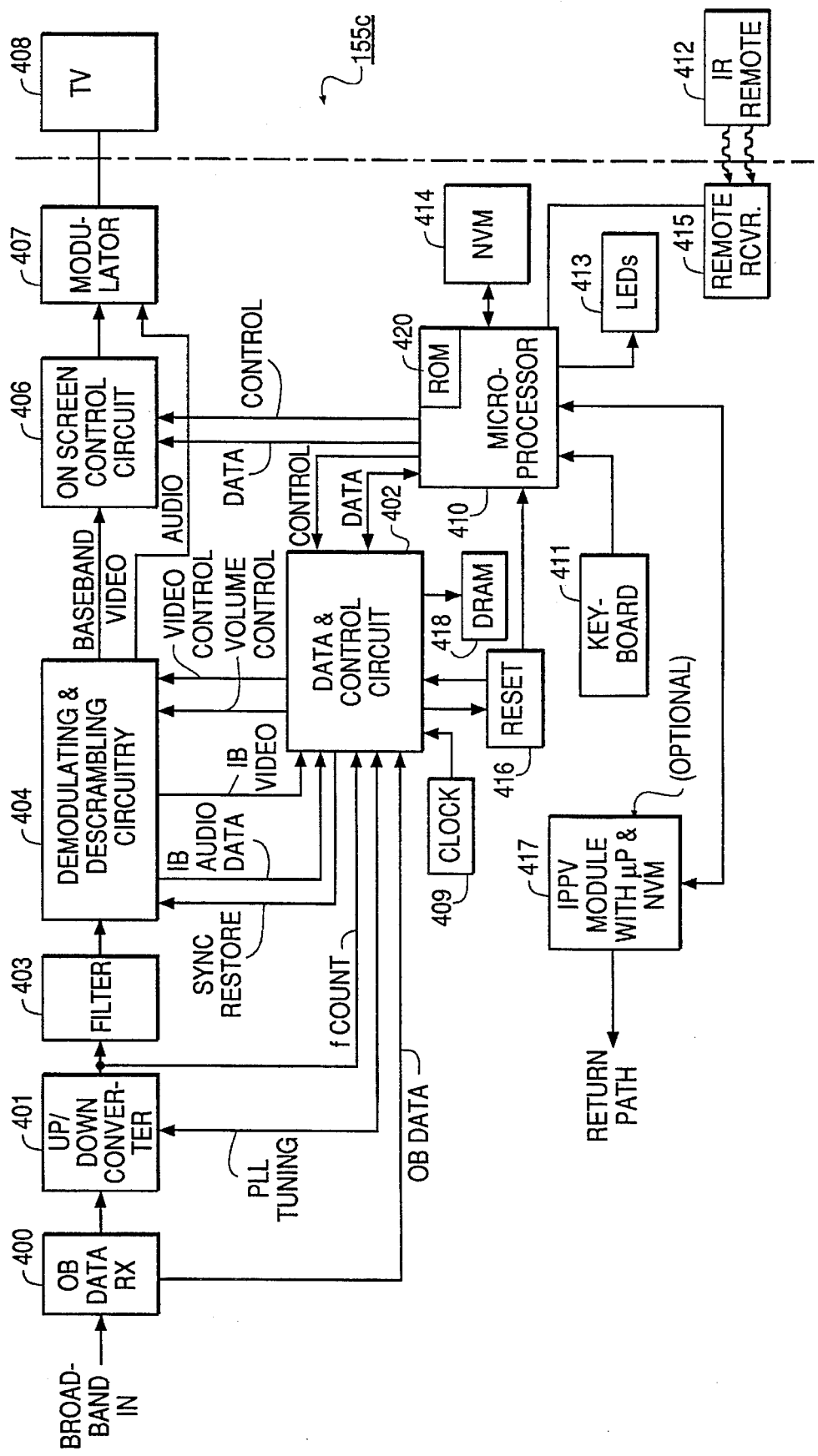
FIG. 4 is a block schematic diagram of in-band/out-of-band data terminal apparatus of FIG. 1 incorporating the principles of the present invention showing a demodulating and descrambling circuit 404, for receiving in-band audio and video data, and a data and control circuit 402 coupled for receiving out-of-band data and the decoded in-band audio and video data.

An alternative means of data transmission is to utilize an otherwise non-dedicated video channel for data transmission. No picture or audio is transmitted; consequently, the entire 4.5 MHZ wide channel is utilized for data transmission. This alternative means is not shown, but may be a further means of increasing data throughput to a terminal 150 to the in-band video, in-band audio and out-of-band data signals described herein. In FIG. 2, there will be a data transmitter (not shown) connected to system control computer 120 for data transmission of the non-dedicated video channel. Referring briefly to FIG. 4, besides an up-down converter for receiving a tuned channel and an out-of-band data receiver, there will be a third data receiver (not shown) permanently tuned to the predetermined non-dedicated video channel in such a system.

System control computer 120 also generates system set-up parameters such as scrambled channels (which channels of the system are scrambled). The system control computer 120 configures tuning frequencies of the channels provided to the subscribers and controls on-screen display as described in copending U.S. application Ser. No. 07/800, 002. A system control computer interface is responsible for gathering and appropriately routing the data leaving the system control computer 120 to the addressable data transmitter 140 and the headend controller 130, out-of-band data to addressable data transmitter 140 and in-band data to headend controller 130.

Known subscriber terminal apparatus may be of two types, in-band and out-of-band, designated 155a and 155b, respectively. An example of a known addressable out-of-band terminal having only non-addressed in-band audio data recovery is the Scientific-Atlanta Model 8580 cable television terminal. An example of a known addressable in-band audio terminal having addressable in-band audio data recovery is the Scientific-Atlanta Model 8600 cable television terminal.

According to the principles of the present invention, a third type of terminal receives in-band, both video and audio, and out-of-band data and is designated 155c. Terminal 155c will be described in greater detail herein in conjunction with the discussion of FIG. 4. Furthermore, according to the present invention, alternative embodiments of subscriber terminal apparatus, not shown, include cable television terminals having only in-band video data recovery or the combination of in-band video and out-of-band data recovery.

Addressable transmitter 140 transmits data to out-of-band subscriber terminals 155b, combination out-of-band/in-band data subscriber terminals 155c or addressable distribution apparatus 165 via a dedicated FM data channel such as a 108.2 megahertz data channel in the cable television distribution system. This channel, known as a data carrier, is used to transmit both addressable commands intended for a particular subscriber terminal 155b or 155c or addressable distribution apparatus 165 or global commands intended for a particular subscriber terminal 155b or 155c in the system. Subscriber terminals 155b or 155c or other terminals having out-of-band data recovery contain a receiver that is listening to the commands sent over this data channel. Unlike the in-band transactions described below, out-of-band subscriber terminals 155b or 155c receive data over this channel no matter what channel the subscriber terminal is tuned to.

Furthermore, optional terminal apparatus 160 may be provided for interdiction or other signal denial forms of service provision. These may receive addressed communications via tap 180 over the out-of-band data carrier and return data via the cable distribution apparatus 165 to headend 100 over a radio frequency return path or via the telephone lines. Such apparatus will not be described in detail herein except to show the compatibility of the present invention with such equipment which may coexist in the same cable television system.

In-band terminal 155a or other terminals such as subscriber terminal 155c according to the present invention may receive addressed communications via in-band audio data transmission. In-band terminal 155a typically will receive such in-band audio data transmission if it is tuned to a scrambled (premium) channel or to a non-premium channel whose associated modulator or signal processor (not shown) is controlled by a data inserter 107a. Typically, however, as introduced above, a data inserter will not be provided for every non-premium channel. Non-premium channels provided in a typical large cable system may number in the hundreds. It is unlikely that a cable operator will provide hundreds of data inserters 107a so that no matter what non-premium channel is tuned, the receiver terminal apparatus 155a will be able to recover in-band audio data.

Consequently, it is proposed according to the present invention to provide terminal apparatus such as terminal apparatus 155c which may alternately receive addressed communications via an out-of-band data carrier as well as via in-band audio transmission. As discussed above terminal 155c also receives in-band video data.

Headend controller 130 is coupled to system control computer 120 and formats system control computer transactions for scramblers 104a–104f. Six scramblers are shown, but there will typically be as many scramblers provided as premium channels to protect from signal piracy. Headend controller 130 stores all transactions and has the ability to perform continuous refreshes. The requirement to constantly, repetitively and efficiently transmit the information base arises since there is no permanently tuned data channel for in-band data transactions with in-band terminals 155a. Thus, all information data flowing to the in-band subscriber terminals 155a is subject to indeterminate availability of a data path to the in-band subscriber terminals 155a.

On the other hand, subscriber terminals 155a may default to tune to a scrambled channel or non-premium channel having a data inserter during periods of non-use as described above. During any such periods of non-use, addressed and non-addressed transactions will be received. For example, an addressed command is transmitted in advance of the period of non-use to advise the terminal of the default channel to be tuned to. When the user turns off their terminal, the terminal automatically changes channel from whatever channel the user was watching to the default channel number. The terminal may store the previously tuned channel in memory and return to that channel as soon as the subscriber turns their terminal on again.

However, to further complicate matters, some of the information is real time critical, i.e., it may pertain to events that are currently in progress or may be critical to maintenance or service charges. For example, one does not want to turn to a program guide for the previous hour's entertainment. Other information, although less time critical in nature, may be of considerable value. Some information is pertinent only to certain of the data streams from the headend controller, as hereinafter described, while certain information causes a write to nonvolatile memory in an in-band subscriber terminal 155a or in-band/out-of-band terminal 155c and must be sent at minimal intervals.

Different groups of data are transmitted on a serial data channel from headend controller 130 to the scramblers 104a–104f and data inserters 107a. Known data groups or data streams include (1) OFF channel data, (2) barker channel data, (3) pay-per-view (PPV) channel data, (4) premium channel data, (5) scroll channel data, and (6) message channel data. Reference should be made to U.S. Pat. No. 5,058,160 and U.S. patent application Ser. Nos. 799,987; 800,002; 800,241 and 800,836 for details of data streams (1)–(4) and (5)–(6) respectively. For example, OFF channel data, a reference data stream, is typically allocated to an un-scrambled channel. These patent applications, concurrently filed by the same assignee, describe a cable television system for transmitting in-band audio data utilized by a subscriber terminal having on screen display capability. Each of these data streams has a unique group address that is received by a group of scramblers having a matching address. For instance, premium channel data may have a group address of 01, and therefore all scramblers on premium channels should have a group address of 01. Headend controller 130 determines which data is output in each data stream.

In accordance with one embodiment of the present invention, data stream (4) contains dedicated channel data for a particular scrambler or a particular data inserter; consequently, it is not addressed to a group of scramblers or inserters but is uniquely addressed to the scrambler or data inserter for the dedicated channel. In this manner, a program guide may be transmitted to a scrambler or data inserter for in-band audio or video transmission (or both) over data stream (4).

In accordance with a preferred embodiment of the present invention, additional data streams are provided for channel program guide information and for new services as follows: (7) basic channel programming guide, (8) complete channel programming guide and (9) new services. The basic channel programming guide data stream (7) provides, for example, a template for identifying the channel and data screens necessary to provide a basic structure for performing channel guide functions. The complete channel guide data stream (9), for example, completes the picture and fills in the gaps in the basic structure to provide a complete programming schedule. An alternative approach between these data streams is to provide higher priority or higher urgency data in one data stream and lower priority or less urgent data in the other data stream. The programming guide information may be, most conveniently, specifically addressed to a scrambler or data inserter for insertion into an associated television channel.

The new services data stream (9) is, for example, for transmitting data, for example, textual and graphics data, to a terminal for display on an otherwise unused television channel. There may be no scrambler, modulator or signal processor for a particular television channel chosen to display this data stream, because the channel is not utilized for television transmission. Nevertheless, a subscriber may tune to a particular channel and receive screens of data (for example, comprising text and graphics) transmitted via data stream (9). The screens or frames of data are generated by a character generator of the user terminal 150 for display on that channel via the user's television receiver or on another predesignated channel. The selected data channel then may be used, for example, as a barker channel, a weather channel, a stock market channel or other source of information.

The new services data stream need not transmit data for display. The data stream may also be utilized for, and need not be limited to, telecommunications, facsimile, video games, digital audio, captioning and other services. When the data stream (9) is used for other services not for display, an appropriate interface must be provided between the subscriber terminal and a suitable auxiliary receiver or terminal for receiving the service. Examples of auxiliary receivers are a telephone set, a personal computer, a facsimile machine, game apparatus, a stereo system or other specialized receiver for selectively receiving data stream (9) via terminal apparatus 150 according to the present invention.

In one preferred embodiment of the present invention, each of data streams (1) to (9) may comprise digital data identifying the data stream. A scrambler or data inserter may be predisposed to accept one or more data streams, for example, by setting certain control switches on a front panel of the device or by storing data stream identifying data received by addressed command from a system control computer or headend controller. The scrambler or data inserter therefore recovers the data stream identifying data from the data stream and matches the data stream identifying data to the prestored data. The device only recovers those data streams where there is a match and ignores all other data streams. Of course, the data streams intended for a particular scrambler or data inserter may be changed at any time by changing the switch settings or by addressed command.

In accordance with another embodiment of the present invention, headend controller 130 provides a single further data stream for in-band video data. That is, there is only one additional data stream (7). In-band video data stream (7), for example, may be channel related, such as a program guide or scrambler control data, and so is also particularly addressed to a particular scrambler or data inserter for the channel. Such a data stream is not broken down into "basic" and "complete" as described above, but is a single additional data stream.

In accordance with another principle of the present invention, any of the data streams can contain dedicated channel data for a particular scrambler or data inserter. Consequently, the data stream may be uniquely addressed to a particular scrambler or data inserter for the dedicated channel. In this manner, a program guide can be transmitted to a scrambler or data inserter for in-band audio or video data transmission (or both) over any data stream for a period of time. Once the guide or other dedicated channel data is transmitted, the data stream can be readdressed to a group of scramblers or to all data inserters and scramblers as appropriate.

In the depicted embodiment, scramblers may be particularly addressed via a four to eight bit address. Data inserters 107 may be particularly addressed as well with a four to eight bit address. Such a configuration assumes that there exist a maximum of two hundred fifty-six scramblers and data inserters for an eight bit address. The least significant bits may define a group of four, eight, sixteen and so on scramblers distinct from a group of four, eight, sixteen and so on data inserters which are utilized to transmit in-band video data on non-premium channels. Alternative data addressing schemes such as addressing by channel number may be utilized and within the principles of the present invention.

Scramblers 104a–104f are coupled to headend controller 130 and may be used to selectively scramble television signals for improved security in a subscription television system that is equipped with appropriate descrambling terminal apparatus 155. The video, for example, may be scrambled in any manner known in the art including sync suppression, sync inversion and video inversion. For illustrative purposes only, it is assumed that scramblers 104a–104f respond to data streams (1)–(9) identified above. The outputs of scramblers 104a–104f are respectively supplied to modulators 105a–105f. Modulators 105a to 105g and so on are provided for each channel of a cable television system requiring the same to change frequencies, that is, to modulate baseband video and audio to carrier channel frequencies within the broadband cable television spectrum other than the received frequency. The outputs of modulators 105a–105f as well as modulators 105g for non-premium channels are supplied to signal combiner 106 which outputs a broadband television signal including the data carrier for distribution over signal distribution apparatus 165 to in-band, out-of-band, and combined in-band, out-of-band subscriber terminals 155a, 155b and 155c. Data to scramblers 104a–f can be provided via the scramblers to data inserters 107a and so on or directly by addressing them as described above.

When a channel is received at the same RF frequency on which it is to be transmitted, then, known so-called signal processor apparatus (not shown), may be utilized to convert the received frequency to an intermediate frequency (IF) between RF and baseband for data inserter 107a to insert in-band audio data according to the present invention by amplitude modulating the in-band audio data on the aural IF carrier. Moreover, the IF video carrier may be utilized for in-band video data transmission or further demodulated to baseband video for data insertion into the vertical or horizontal blanking intervals of the baseband video signal as described further herein according to the following discussion of FIGS. 2 and 3.

The broadband video channel output of the combiner 106 of the headend 100 includes all the channels, both premium and non-premium, scrambled and non-scrambled, and the out-of-band data channel. The bandwidth today of the cable television spectrum may exceed 650 MHz and, utilizing fiber optic cable, exceeds 1 GHz.

Figure 2:
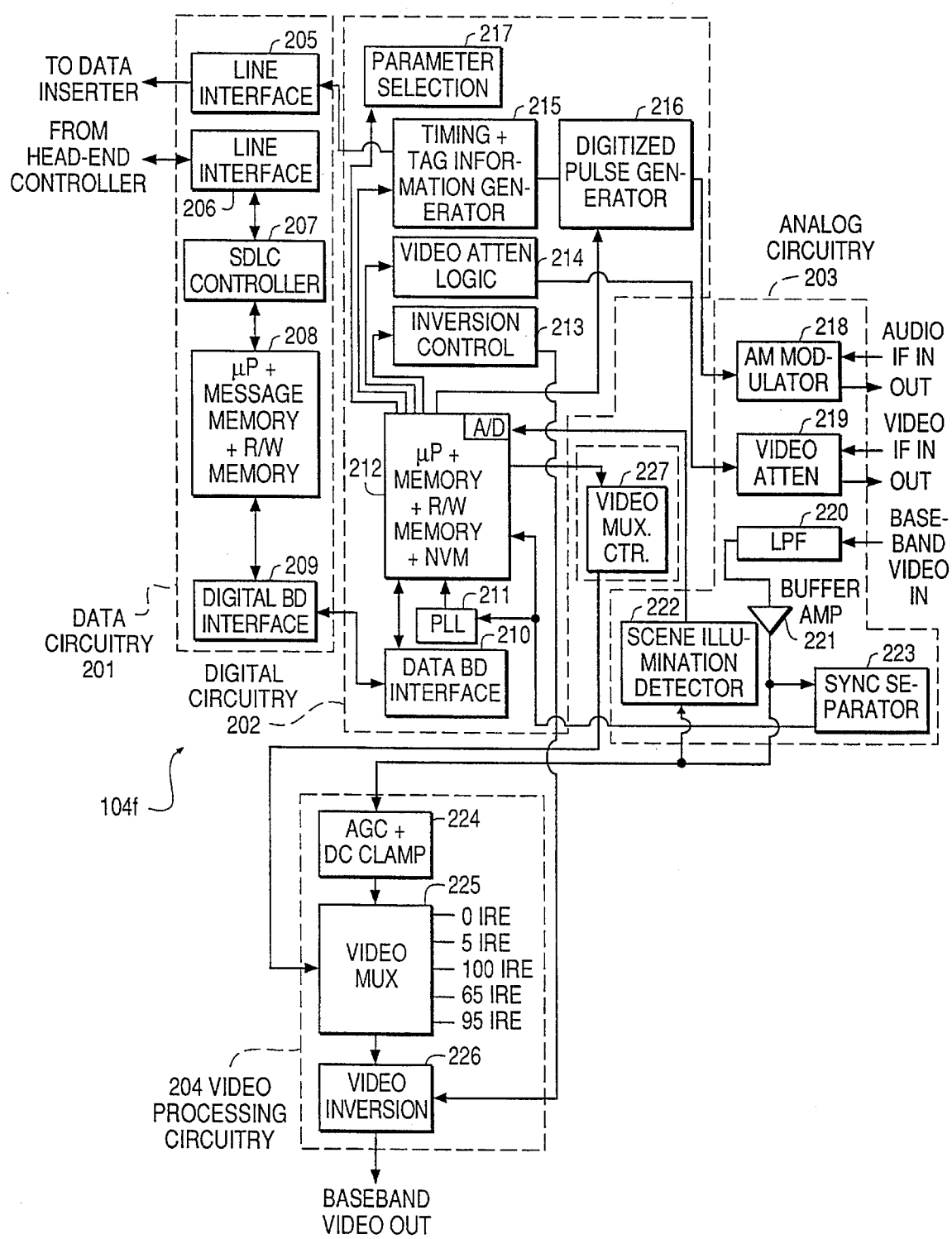
FIG. 2 is a block schematic diagram of a television signal scrambler shown in FIG. 1.

FIG. 2 is a block diagram of, for example, scrambler 104f shown in FIG. 1. Scrambler 104f receives any of the data streams (1) through (9) including message channel data (4) from headend controller 130. The message channel data includes character information for display screens which may be addressed to one or more subscriber terminals for display on an associated television. Scrambler 104f includes data circuitry 201, digital circuitry 202, analog circuitry 203 and video processing circuitry 204, provided the scrambler is equipped to perform baseband video processing. Data circuitry 201 includes line interfaces 205 and 206, synchronous data link controller (SDLC) 207, microprocessor 208, and digital circuit interface 209.

SDLC 207 controls communication via line interface 206 between scrambler 104f and headend controller 130. SDLC 207, for example, may be predisposed to only accept certain data streams from the headend controller 130 by the stream identifying data transmitted with each data stream. Front panel control switches of the scrambler or data inserter may be set in a predetermined manner with the streams to be accepted for in-band transmission. This data may be recovered via parameter selection circuit 217 and processed at microprocessor 212. Microprocessor 212 signals microprocessor 208 to control SDLC controller 207 accordingly to ignore any non-selected data streams. Moreover, the streams may be predetermined by addressed command and stored in scrambler or data inserter memory. Such addressed commands are accepted in microprocessor 208 and the data stream data stored in microprocessor 208 memory. If the stream identifying data transmitted with the data streams matches the stream data prestored in memory or set by the front panel switches, then, the stream data will be accepted by SDLC 207. Other data streams are ignored.

Microprocessor 208 receives and processes information from SDLC 207. Information such as message information is stored in non-volatile message memory of microprocessor 208. To ensure sufficient memory for message data, there is preferably at least 128k bytes of non-volatile message memory. Read/write memory of microprocessor 208 stores temporary information. Interface circuit 209 interfaces the data circuitry to the digital circuitry.

Generally, the path of the several data streams for in-band transmission through the scrambler 104f follows from line interface 206, through SDLC 207, through processor 208, through interfaces 209 and 210, and via processor 212. In-band audio data follows the path through timing and tag generator 215, digitized pulse generator 216 and AM modulator 218. In-band video data and control data is transmitted to video multiplexer controller 227 for selectively operating video multiplexer 225 as will be described in detail in the following discussion of FIG. 3.

Digital circuitry 202 includes interface circuit 210, phase locked loop 211, microprocessor 212, inversion control circuit 213, video attenuation logic 214, timing and tag information generator 215, digitized pulse generator 216, parameter selection circuit 217. Interface circuit 210 interfaces digital circuitry with data circuitry 201. Microprocessor 212 controls all essential functions and features of scrambler 104f. Microprocessor 212 extracts and processes all data streams including message data stream (4) and the new data streams (7)–(9) from the data circuitry, controls the scrambling modes of the system and controls in-band video data insertion via video multiplexer controller 227, which may comprise a portion of digital circuitry 202 or video processing circuitry 204.

Digitized pulse generator 216, responsive to the timing and tag information generator generates the specific pulses placed on the sound carrier via the AM modulator 218 of the analog circuitry 203 under the control of microprocessor 212. A further description of digitized pulse generator 216 is found in U.S. application Ser. No. 891,053, filed Jun. 1, 1992, incorporated herein by reference as to essential subject matter. These in-band audio pulses may represent authorization and control information, descrambling information including timing pulses and message information or other information. Microprocessor 212 is also coupled to parameter selection circuitry 217 which may be a front panel display and keyboard which permits an operator to select various modes of operation, for example, different scrambling modes and/or different data streams. According to the present invention, scrambling mode data necessary for descrambling is transmitted as in-band video data via video processing circuitry 204.

Analog circuitry 203 includes AM modulator 218, video attenuation circuitry 219, low pass filter 220, buffer amplifier 221, scene illumination detector 222 and synchronization pulse separator 223. AM modulator 218 amplitude modulates the pulses from pulse generator 216 onto an audio intermediate frequency (IF) carrier signal from modulator 105f and outputs the modulated signal to modulator 105f. Video attenuation circuitry 219 selectively provides sync suppression type scrambling and attenuates a video IF signal from modulator 105f under the control of video attenuation logic 214.

In one embodiment of the present invention, data inserter 107a is associated with scrambler 104a and, according to the present invention, accomplishes the same functions as microprocessor 212, timing and tag information generator 215, digitized pulse generator 216 and AM modulator 218 and has similar structure. In such an embodiment, data inserter 107a need not comprise a microprocessor or timing and tag generator but may act as a slave to corresponding elements of the associated scrambler 104a. Data inserter 107a may simply comprise a data repeater coupled to line interface 205 for repeating the same in-band audio data stream as would be provided on the aural carrier of the associated scrambled channel. Consequently, the same in-band audio data stream is transmitted on the premium channel as the non-premium channel.

In one preferred embodiment of a data inserter, the data inserter is separately addressed by system control computer 120 by a direct communication link (not shown). Data inserter 107a may thus comprise a separate, intelligent unit having its own microprocessor and timing and tag generator. Data inserter 107a may, for example, amplitude modulate selected in-band audio data streams onto the audio carrier of the non-premium television channel with which it is associated, such as channel identification and program guide information data streams.

In yet another preferred embodiment the data inserter 107a further comprises at least some analog circuitry 203 and video processing circuitry 204 including a video multiplexer controller 227 and a video multiplexer 225 as will be subsequently described herein for providing in-band video data transmission on a non-premium channel.

Referring to analog circuitry block 203, baseband video input is filtered with low pass filter 220 which may be a sharp cut-off phase equalized low pass filter. Low pass filter 220 removes high frequency video components that can create audible noise from cross-modulation of the sound carrier. After filtering, the video is amplified back to its original level by video amplifier 221. Sync separator 223 extracts synchronization information which is then sent to microprocessor 212 to provide timing information such as composite and vertical sync and odd/even field indication. For example, the microprocessor 212 generates timing signals at, at least, the line rate and twice the line rate to determine start and stop locations for in-band video data insertion, equalizing pulse removal, horizontal timing pulses and such as required, for example, to establish 0 IRE video signal levels at equalizing pulse locations for insertion of in-band video data. The scrambler is clocked by a clock circuit not shown, preferably a crystal controlled oscillator operating, for example, at 20 MHz, a rate shared by a corresponding clock circuit of any subscriber terminal. The 20 MHz clock may be utilized by microprocessor 212 and may be divided down by well known clock divider circuitry to provide a suitable data rate, for example, 4 or 5 megabits per second, on the order of the teletext rate at 5.7 megabits per second for transmitting data streams received from headend controller 130 as in-band video data.

Scene illumination detector 222 determines the average luminance level of a scene, which level is supplied to an A/D converter of microprocessor 212. Microprocessor 212 uses this luminance information to detect scene changes in order to determine when scrambling modes may optimally be changed. The composite synchronization signal is supplied to the input of phase locked loop (PLL) 211. Phase locked loop 211 locks the system clock to the line rate of the input baseband video signal. A voltage controlled oscillator (not shown) of the phase locked loop outputs the clock signal for microprocessor 212 and the system clock.

The baseband video signal from amplifier 221 is supplied to video processing circuitry 204. Video processing circuitry 204 comprises automatic gain control AGC and DC clamp circuit 224, video multiplexer 225 and video inversion circuitry 226. The AGC of the AGC and DC clamp circuit 224 adjusts the incoming signal to a predetermined value such as 1 V (100 IRE). The DC clamping of circuitry 224 forces the bottom of the sync tip to be at ground. The output of circuitry 224 is supplied to a video multiplexer circuit 225. One form of video multiplexer circuit is a split synchronization circuit discussed in detail in commonly assigned U.S. Pat. No. 4,924,498, incorporated herein by reference. The output of such split synchronization circuitry is provided to inverting circuitry 226 for inverting the baseband video about an inversion axis. Inversion is controlled in accordance with signals from inversion control circuit 213. More particular details of scramblers 104a–d may be found in U.S. Pat. No. 5,058,160.

The operation of video multiplexer 225 will now be described in some detail. Microprocessor 212 provides data streams to be transmitted as in-band video data such as channel guide, new service and scrambling control information to video multiplexer controller circuit 227. Video multiplexer controller 227 comprises sufficient bit line outputs, for example, three bit output lines to control video multiplexer 225 in such a way as to gate any one of a plurality of voltage levels or the baseband video input signal to output to video inversion circuit 226. These video signal levels may be 0 IRE, 5 IRE, 100 IRE, 65 IRE, 95 IRE and other negative valued IRE levels which may be utilized, for example, for split synch and synch inversion scrambling. On utilized negative value may be –46 IRE for insertion of pulses to defeat unauthorized descrambling of scrambled signals. As signalled by microprocessor 212, the video multiplexer controller outputs, for example, one of eight (or one of sixteen) as appropriate selection signals to select one of the input voltage levels or baseband video for output to video inversion circuit 226. In this manner, a voltage level less than 100 IRE may be established as a pedestal, less than 80 IRE, less than 70 IRE or whatever as required. After the pedestal is provided, the same control signals are applied at the data rate to establish data pulses at the respective levels. A bipolar output is contemplated by the present invention, for example, at 95 IRE and 0 IRE. Yet, the present invention is not intended to exclude pulse amplitude modulation at four or eight or more levels to increase data throughput.

Furthermore, according to the present invention, the video multiplexer 225 may have IRE level input signals at the horizontal synchronizing pulse level (for example, —40 IRE) for synch inversion, split synch and for insertion of data at approximately the teletext rate (5.7 megabits/sec) or other suitable rate such as 4 or 5 megabits per second as suggested herein. The appropriate, divided down, clock rate for operating microprocessor 212 is utilized for clocking the operation of selection signals generated by video multiplexer controller 227.

In-band video data may be inserted at any time not utilized for picture transmission. For example and referring briefly to FIG. 6a, data may be inserted into the period of time occupied by the horizontal synch pulse, that is, roughly a five microsecond window, the back porch following horizontal synch and before the color burst, and after the color burst and before active video. Such a system may be described as data in horizontal synch and further increases in-band video data transmission capacity beyond data in vertical synch as described above. Of course, such a system requires complementary restoration of the horizontal synch pulse in a similar manner as restoration of removed equalizing pulses in lines 7, 8, and 9 is contemplated by data in vertical synch.

Perhaps a better way to define in-band video data is data in either the horizontal or vertical blanking interval, the point being that any portions of the video signal may be utilized for data transmission that do not interfere with active video. For example, in some embodiments, active video may be compressed and transmitted as video data without degrading from the video picture content. Furthermore, synchronization data may be compressed as well. A field flag denoting a change of field from odd to even and a brief period of horizontal clock each field is all the synchronization information that is required in some known televisions systems such as B-MAC. Thus, in band video data may fill the video signal bandwidth in any portions not utilized for picture or synchronization.

Figure 3:
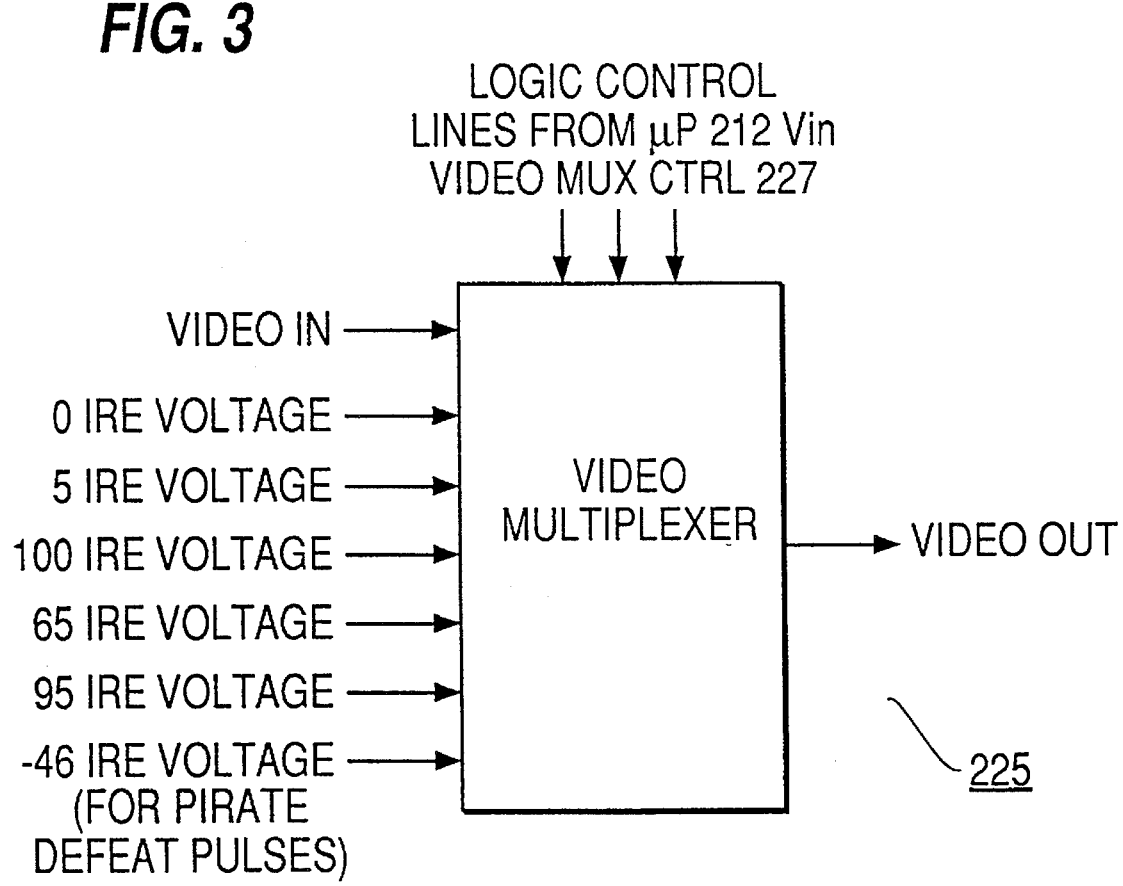
FIG. 3 is a block schematic diagram of an in-band video data inserter which may comprise a portion of a scrambler or a television channel data inserter of the headend of FIG. 1.

FIG. 3 provides further details of video multiplexer 225. Video multiplexer 225 may comprise an element of scrambler 104f, data inserter 107a or another element of a cable television headend including but not limited to a modulator or signal processor. Logic control lines are provided from microprocessor 212 via video multiplexer controller 227 for controlling selection one of a plurality of input signals comprising a baseband video input signal and several predetermined input IRE voltage levels.

The levels shown are exemplary only and include, but are not limited to including, 0 IRE, 5 IRE, 100 IRE, 65 IRE, 95 IRE or –46 IRE. "Video In" or baseband video input is at least selected during periods of active video. At all other times, according to the present invention, another predetermined voltage level may be selected for providing a pulse amplitude modulation form of data transmission. For example, during periods of horizontal and vertical synch, bipolar transmission at 0 IRE or the synch level may be inserted into selected synchronization periods. Also, other periods may be selected when, typically, during baseband video, a 0 IRE level is anticipated.

A −46 IRE voltage level is utilized for, for example, a four to six microsecond duration as a pirate defeat pulse at selected insertion points in the baseband video signal to fool a pirate box into interpreting the pulse as horizontal synch, inverted horizontal synch or, shorter or longer durations as another expected pulse, such as serrated sync or equalizing pulses. A pirate box will undertake an operation which may further scramble a signal while a terminal according to the present invention may be predisposed to ignore such a pulse.

Consequently, according to the present invention, the video multiplexer of FIG. 3 may comprise an element of baseband video processing circuitry for performing a variety of functions. These function include, and are not limited to including: baseband video signal blanking, data insertion into any unoccupied regions of the video signal, synch inversion, split synch insertion and pirate defeat pulse insertion.

An alternative method of providing, for example, an equalizing pulse output during periods of in-band video data transmission is to force certain bit positions of the in-band video data to low, namely, those bit positions being predetermined and occurring at the time of equalizing pulse transmission. By forcing the bits low, the equalizing pulse will be transmitted unmodified or unmodulated by an amplitude modulator.

FIG. 4 is a block diagram illustrating the components of a subscriber terminal in accordance with the present invention for receiving in-band audio, in-band video and out-of-band data. Further details on in-band subscriber terminals having channel identification and messaging features are found in commonly assigned copending U.S. application Ser. Nos. 799,987; 800,002; 800,241 and 800,836, incorporated by reference. Although the subscriber terminal described below is a baseband television subscriber terminal, it will be apparent that other subscriber terminals such as RF subscriber terminals may be utilized. For example, an in-band audio only terminal may be equipped with a 108.2 MHz out-of-band data receiver or other out-of-band data receiver 400. If the out-of-band data is transmitted by frequency shift keying a 108.2 MHz carrier, then, out-of-band data receiver 400 comprises an FSK demodulator. Such a terminal as contemplated by the present invention need not process a baseband video signal to recover in-band data.

On the other hand, a baseband video cable television terminal is contemplated by the present invention which processes only in-band video data. In an alternative embodiment, a baseband video cable television terminal according to the present invention comprises an in-band video data receiver and one or more out-of-band data receivers.

Referring now to FIG. 4, a broadband television signal from signal distribution system 165 is received at up/down converter 401 and at least one out-of-band data receiver 400. The out-of-band data receiver 400 shown is coupled to the broadband input. The up/down converter 401 need not receive a signal from the out-of-band data receiver 400; each may be coupled directly to the incoming broadband signal in parallel. Up/down converter 401 is tuned to a predetermined channel for receiving in-band audio data when not in use. The channel is predetermined from the system control computer 120 and by one of the data transmission methods described herein the predetermined channel is stored in terminal apparatus according to the present invention.

When in use, the up/down converter 401 is tuned according to a channel entered by a user via remote control 412 or terminal keypad 411. For example, the user may select a television channel to watch, a predetermined "barker" channel or a text and graphics data channel, as described above. Up/down converter 401 uses a phase locked loop (not shown, but incorporated in block 401) under the control of data and control circuit 402 to convert the selected or predetermined default RF input signal, for example, to an intermediate frequency (IF) signal (typically, at 45.75 MHz). Data and control circuit 402 is linked to up/down converter 401 by a bidirectional link, the link from circuit 402 to up/down converter 401 for oscillator tuning, the return link for feedback control of the tuning.

The output of the up/down converter 401 is tapped into via a directional coupler (not shown) and provided to data and control circuit 402 for counting the intermediate frequency output of the up/down converted video signal. The output labeled f count may be passed through an optional IF band pass filter (not shown) to the data and control circuit 402 for noise filtering. The frequency count is used for up/down converter operation to assure an accurately tuned process and for signal timing purposes. For example, the frequency count is compared with a predetermined number stored in memory for the IF frequency and fedback to the phase locked loop until the intermediate frequency (f) matches the stored frequency number.

Filter 403 such as a SAW filter filters the signal to remove RF noise. Filter 403 further separates the input IF channel in audio and video IF carrier signals. Demodulating and descrambling circuitry 404 demodulates and descrambles the filtered video signal under the control of data and control circuit 402. The demodulating circuitry of circuitry 404 comprises a demodulator for demodulating the received picture carrier to a baseband video signal. If the in-band video data is impressed in the baseband video signal, then, the in-band video data is recovered therefrom as will be further described from FIGS. 4a and 4b. The demodulating circuitry of circuitry 404 also comprises a sound carrier demodulator for recovering pulse amplitude modulated data, the in-band audio data, from the sound carrier as will be further described from FIG. 4c. Demodulating and descrambling circuitry 404 thus performs pulse detection to recover the in-band audio data amplitude modulated onto the audio carrier. The recovered data labeled IB Audio Data is supplied to data and control circuit 402.

Volume control of the audio is performed by demodulating and descrambling circuitry 404 under the control of data and control circuit 402 and microprocessor 420 as described in U.S. Pat. No. 5,054,071, incorporated herein by reference.

Demodulating and descrambling circuitry 404 recovers in-band video data labeled IB Video and forwards the same to data and control circuit 402. Because the data is at a reasonably high rate of speed, data and control circuit 404 is clocked at a sufficiently high rate by clock circuit 409, preferably a crystal controlled oscillator at a frequency of approximately 20 MHz or faster.

The in-band video data having been transmitted at a frequency on the order of known teletext systems at 5.7 megabits per second, such as at 4.0 or 5.0 megabits per second, the data clock provides an appropriate sampling frequency at the Nyquist rate according to well known techniques such as by dividing down a 20 MHz clock rate and applying a phase locked loop to lock the divided down clock rate to the incoming in-band video data signal. Data and control circuit 402 receives the in-band video data in DRAM 418 prior to forwarding to microprocessor 420, the DRAM 418 serving as a data buffer prior to microprocessor processing. Further details of in-band video data insertion and recovery are discussed in detail herein in conjunction with the discussion of FIGS. 4a and 4b and waveform FIGS. 5 and 6.

Demodulating and descrambling circuitry 404, responsive to signals on video control leads, controls the restoration of the baseband video signal to include removed equalizing pulses as required and controls video inversion, synch inversion and any other descrambling functions as required. For example, the demodulating and descrambling circuitry 404, responsive to previously received data, is automatically configured to descramble in one of a plurality of descrambling modes as controlled from headend 100.

The output of demodulating and descrambling circuitry 404 is an unscrambled baseband video signal which is supplied to on-screen display control circuit 406. On screen display control circuit 406 may be a Mitsubishi M50556 on-screen display controller or similar integrated circuit or application specific integrated circuit. On screen display control circuit 406 selectively generates on-screen character and graphics displays in place of or overlaid on the video signal. Background audio is also programmable according to U.S. Pat. No. 4,991,011. Modulator 407 converts the signal containing the video, audio, and/or characters from display control 406 on channel 2/3/4 which is supplied to television receiver 408 in well known manner.

Microprocessor 420 or other data processing controller controls the overall operation of subscriber terminal 155c. Keyboard 411 on a front panel of the subscriber terminal generates subscriber supplied signals for channel tuning, volume level, and the like which are supplied to microprocessor 420. Remote receiver 415 receives commands from infrared (IR) or other remote control unit 412, as is well known in the art, and provides the commands to microprocessor 420. Reset circuitry 416 resets microprocessor 420 and/or data and control circuit 402 to ensure proper operation of the system if there have been power surges, power failures or like events requiring reset processes.

When keyboard 411 or IR remote 412 is utilized to select a television channel, processor 420, most conveniently a microprocessor, instructs data and control circuit 402 to appropriately control up/down converter 401 to tune the selected television channel or, when the terminal is not being utilized, to tune to a predetermined default channel. Data and control circuit 402 utilizes recovered descrambling data to generate appropriate control signals, for example, inversion control and equalizing and sync restoration or regeneration for descrambling or otherwise restoring the input baseband television signal. Microprocessor 420 determines whether data and control circuit 402 carries out descrambling on a particular channel or what form of descrambling is required at a particular time by interpreting authorization and control data downloaded from the system control computer 120 (by any of the three data transmission schemes discussed herein, out-of-band, in-band audio or in-band video).

LED display 413 displays channel numbers and diagnostics. Non volatile memory (NVM) 414 or similar memory stores data, for example, authorization data, scrambled channel data, scrambling mode data, terminal configuration data and other required data. The processor 420 may have some on-board permanent memory, for example, for program storage or software storage, and may be equipped with random access memory (not shown).

Subscriber terminal 155c may optionally include impulse pay-per-view (IPPV) module 417. IPPV module 417 allows the subscriber to authorize their subscriber terminal to receive a pay-per-view event, store the data associated with the purchase of the event in non-volatile memory 414 and transmit the data to the system operator via a telephone return path or a radio frequency path via the signal distribution apparatus 200.

Other configurations of terminal 155c shown in FIG. 4 are possible. DRAM 418 need not be external DRAM but may be incorporated as static random access memory in data and control circuit 402. Furthermore, non-volatile memory 414 may be combined within microprocessor 420. Data and control circuit 402, demodulating and descrambling circuitry 404, on screen display controller 406 microprocessor 420 and some of the impulse pay-per-view functions of IPPV module 417 may be combined in one, two or three application specific integrated circuits depending on tradeoffs of cost effectiveness and efficiency of operation.

A number of other features of subscriber terminal 155c not pertinent to the present invention are described in copending concurrently filed U.S. application Ser. No. 07/984,023. For example, terminal 155c may comprise a plug-in expansion card for ensuring security of communications and operations, a data port for transmitting and receiving data, and AGC and AFC circuits.

Figure 4A:
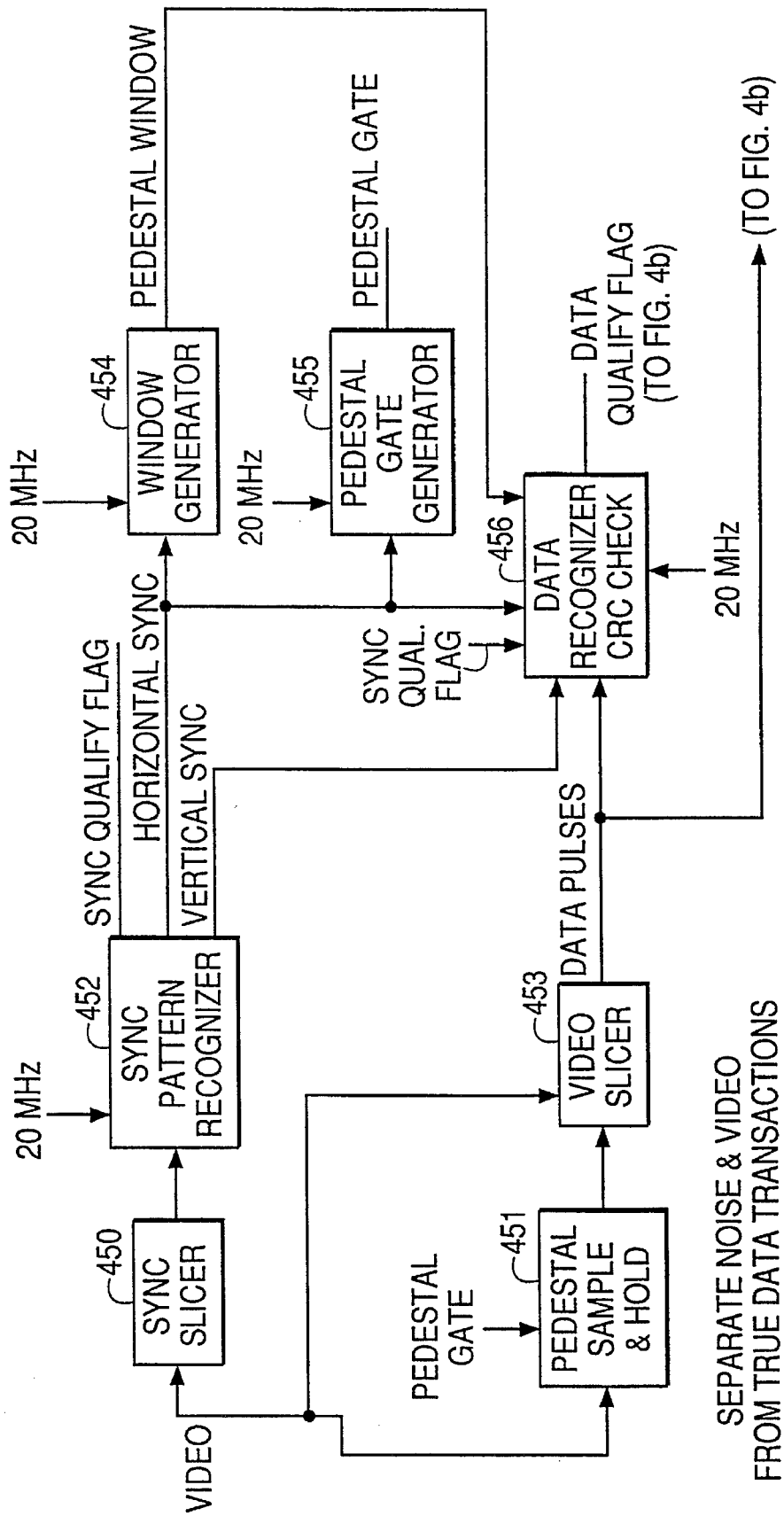
FIG. 4a and 4b are block schematic diagrams showing one process of demodulating and descrambling circuit 404 and data and control circuit 402 of FIG. 4 in greater detail for recovering in-band video data.
Figure 4B:
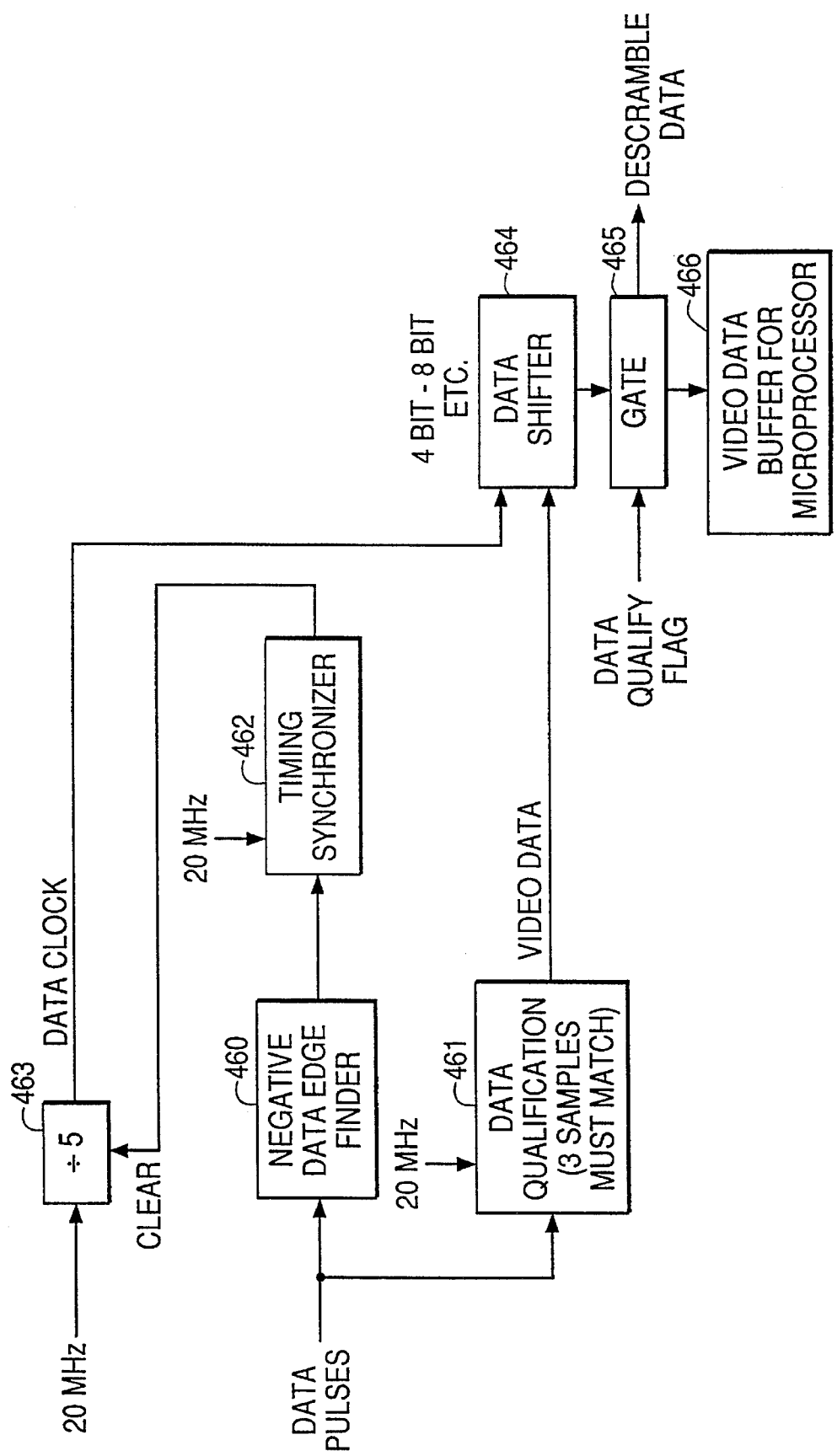

Referring now to FIGS. 4a and 4b, the process of recovering in-band video data will be described in greater detail. The operations of demodulating and descrambling circuit 404 and data and control circuit 402 will now be described in conjunction with the waveforms of FIGS. 6a, 6b and 6c. In the process of FIGS. 4a and 4b, it is not essential that the terminal apparatus 155c of FIG. 4 be pre-advised of the line numbers of the vertical blanking interval in which data has been inserted. The circuit follows the steps of separating noise and video from true data transactions, processing the recovered data and gating the recovered data into a video data buffer. Every line of the baseband video signal is examined for data content and further functions of data recovery and recognition are determined by the presence of a predetermined in band video data pattern, for example, by the waveform of FIG. 6a and/or by a unique data bit pattern having a predetermined number of bits.

The received baseband video provided to demodulating and descrambling circuitry 404 is received at sync slicer 450, pedestal sample and hold 451 and video slicer 453. Referring to waveform FIG. 6a, the received video comprises a sync portion, a color burst, possible descrambling artifacts, and a data portion comprising a pedestal and data. This predetermined pattern is distinguished from active video and required data transmission such as captioning data and video test data. There may be a one microsecond or four bit interval between the end of pedestal and the beginning of transaction data at 0 IRE. Sync slicer 450, sync pattern recognizer 452 and so on form a sync chain for recognizing horizontal synch, vertical synch and, therefrom, determining a pedestal window and pedestal gate pulse utilized by the data determining chain. The data determining chain comprises pedestal sample and hold 451, video slicer 453, and data recognizer and check circuit 456.

Starting with the sync chain, sync slicer 450 looks for signals between 0 IRE and −40 IRE to determine if synch, serrated sync or equalizing pulses are present and provides an output to sync pattern recognizer. Sync pattern recognizer, clocked at the 20 megahertz clock rate of the terminal, outputs a signal if there exists horizontal sync or vertical sync and a sync qualifying flag. Horizontal sync is output to a window generator 454 which generates a pedestal window (FIG. 6b) for the leading edge of the pedestal of FIG. 6a. Horizontal sync is also provided to a pedestal gate generator 455 for generating a pedestal gate signal as per FIG. 6c. Both the window generator 454 and the pedestal gate generator 455 are clocked by the 20 megahertz clock output of terminal 155c. Values shown in FIG. 6 are exemplary only and one of ordinary skill may deviate from these values without departing from the spirit of the present invention.

Now, the data chain will be discussed in some detail. The baseband video signal is first provided to pedestal sample and hold 451 which receives the pedestal gate signal from pedestal gate generator 455 as an input. By gating the pedestal sample and hold circuit at the expected pedestal position, for example, 11.8 microseconds after detection of horizontal, the possibility of interpreting descrambling artifacts (shown in FIG. 6a) as pedestal is avoided. Pedestal sample and hold 451 samples the signal level during a short, for example, 0.5 microsecond window during, for example, a one microsecond pedestal and holds the value for future processing. If the received pedestal level is 95–100 IRE, for example, the data slicing level of 47.5–50 IRE is passed to the video slicer 453. If the received level is less than 100, such as 65 IRE, then a level of 32.5 IRE is passed to the video slicer 453. Video slicer 453 passes any signals approximating data after the pedestal to data recognizer and check circuit 456 and to FIG. 4b. Data recognizer and clock circuit distinguishes active video and required captioning or test signal data from in-band video data by its position, amplitude, frequency and/or predetermined bit pattern. The data pulses received at data recognizer circuit 456 are qualified by sync qualifying signal output of sync pattern recognizer 452, by horizontal and vertical sync inputs and by pedestal edge window (FIG. 6b). Pedestal edge window signal FIG. 6b comprises, for example, a one microsecond window eleven microseconds after detection of the beginning of horizontal synch for identifying the beginning of pedestal signal. Data recognition circuit 456 determines the beginning of pedestal and provides a data recognition service during the 50 microsecond, 200 bit, 25 byte data window that follows the beginning of pedestal. A data qualifying flag signals the true and accurate presence of in-band video data. The data qualifying flag may further qualify one form of received data from another, for example, new services data from descrambling mode data. The data recognizer may also perform error detection and correction, for example, via a cyclic redundancy check scheme or other data error detection or detection and correction method.

The data pulse stream output is provided to the circuitry of FIG. 4b and, in particular, at negative data edge finder 460 and data qualification circuit 461 clocked at 20 megahertz. If a predetermined number of data samples match, for example, two or three, then the in-band video data is forwarded to data shifter 464. Negative data edge finder signals timing synchronizer 462 whenever a data pulse edge goes negative. The timing synchronizer, clocked at 20 megahertz, accordingly signals a clear signal to divide by five circuit 463 for dividing the 20 megahertz clock by five and providing a 4 megahertz output. The output then of divide by five circuit 463 is a data clock for shifting the data via data shifter 464 into gate 465.

Data gate 465 requires data qualification flag from data recognition and checking circuit 456 to gate the received data into in-band video data buffer 466 (most conveniently DRAM 418) or gate the data determining a descrambling mode to demodulating and descrambling circuit 404. As previously described DRAM 418 provides a data buffer for buffering in-band video data to microprocessor 420.

Consequently, in the processes for recovering in-band video data described by FIG. 4a and 4b and referring to FIG. 6, the method comprises the steps of determining the beginning of horizontal sync, establishing a gate for detecting a pedestal signal level and establishing a data window for recovering data at a value corresponding to the pedestal signal level. Possible descrambling artifacts appearing prior to the horizontal pulse and after the color burst are avoided according to this embodiment which could corrupt data recovery processes.

Figure 4C:
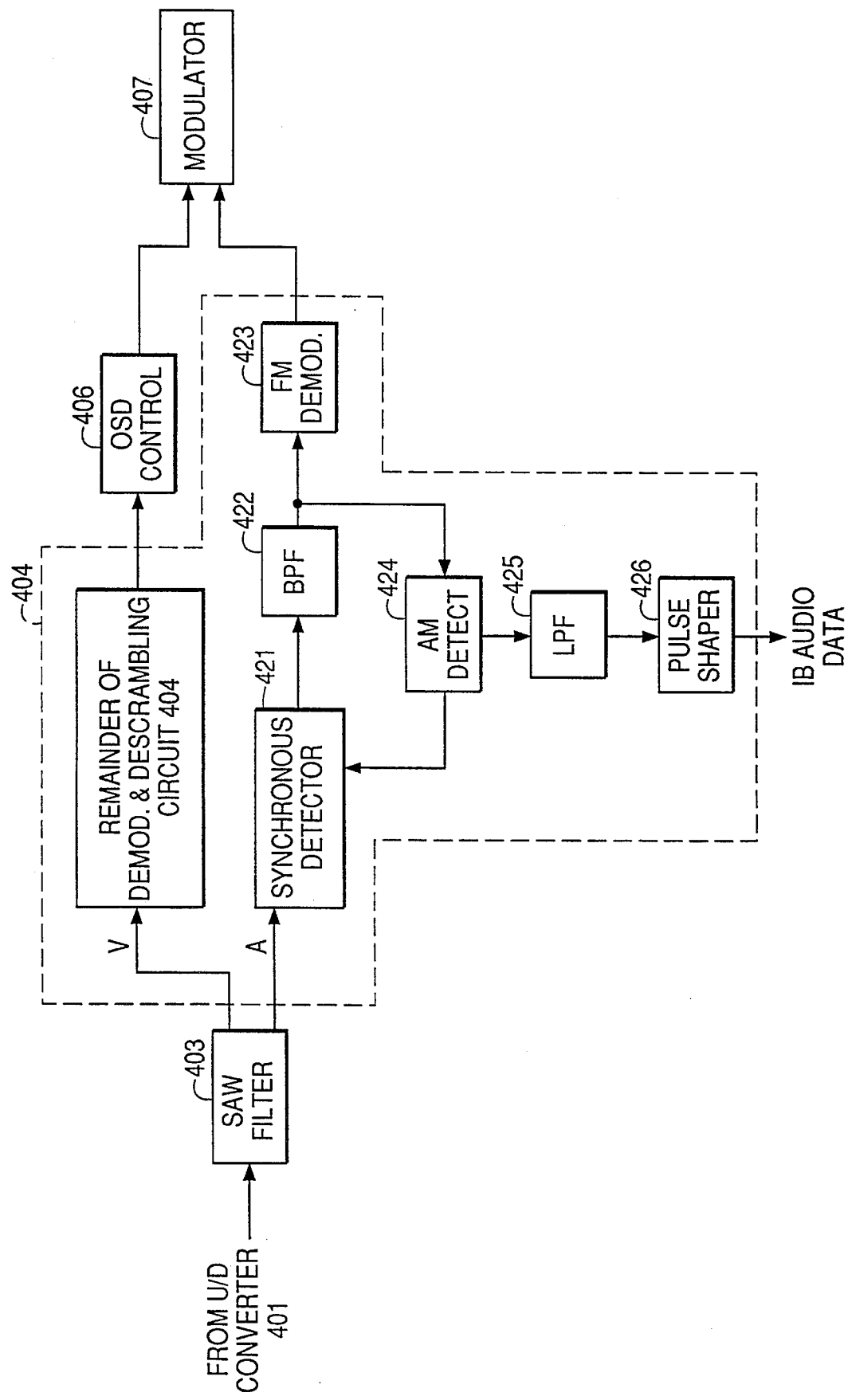
FIG. 4c is a block schematic diagram showing one process of demodulating and descrambling circuit 404 of FIG. 4 in greater detail for recovering in-band audio data.

Referring now to FIG. 4c, there is shown a more particular block diagram of a portion of subscriber terminal 155c for recovering in-band audio data from a tuned-to video channel. The tuned-to video channel at IF recovered at up/down converter 401 is input to SAW filter 403 as already described. The video picture signal V is provided via filter 403 to the remainder of demodulating and descrambling circuitry 404 and so on as already described. The audio IF carrier at 41.25 MHz is provided to synchronous detector 421. Synchronous detector 421 converts the IF audio carrier to an intermodulation frequency of 4.5 MHz by mixing the two IF carriers (45.75 and 41.25 MHz) and extracting the difference. The output is filtered at 4.5 MHz at band-pass filter 422 and provided to FM demodulator where the audio baseband signal is recovered according to U.S. Pat. No. 4,567,517. Thereafter, volume control is then performed as described in issued U.S. Pat. No. 5,054,071, prior to modulator 407 for remodulating the volume controlled baseband audio.

The 4.5 MHz audio carrier output of BPF 422 is provided to amplitude modulation detector 424 which may, for example, comprise a simple diode detector. If horizontal timing pulses are transmitted on the aural carrier, these may be utilized as control for synchronous detector 421. The detected data pulses are filtered at low pass filter 425, for example, at the line rate to eliminate noise and are re-shaped at pulse shaper 426. The properly formed data pulses are then input as IB Audio Data to Data and Control Circuit 402.

Referring now to FIG. 5, the process for inserting and decoding data in the vertical blanking interval of a baseband video signal will now be described in some detail. Waveform 5a is a typical baseband video waveform showing standard NTSC composite synchronization, lines 7–11 after the beginning of the vertical blanking interval being identified. PAL/SECAM and still to be determined high definition television synchronization formats are all related in providing some form of horizontal blanking interval and vertical blanking interval to permit a television receiver to move a scanning beam from one side of the image to the other or from the bottom to the top respectively. Consequently, in accordance with the present invention, the principles of providing an in-band video data signal at times not utilized for active video such as at certain blanked lines during the vertical blanking interval of the baseband video signal may be applied to any television format and the NTSC signal format is utilized by way of example only.

In fact, utilizing the principles of the present invention, not only the vertical blanking interval may be utilized but portions of the horizontal blanking interval may be utilized as well for in-band video data transmission. For example, certain horizontal blanking pulses may be removed and data inserted in their place.

According to one embodiment of in-band video terminal 155c, the data and control circuit 402 of a receiver may maintain a count of horizontal lines and a time clock synchronized to the line rate in a similar manner to the microprocessor 212 and phase lock loop 211 of a scrambler. The time clock of a subscriber terminal is highly accurate and capable of determining the beginning and end of expected synchronization pulses including equalizing pulses.

In an alternative embodiment to the one discussed above in connection with FIGS. 4a and 4b, the data and control circuit 402 may count from the beginning of the vertical blanking interval, depending on odd and even fields, and accurately determine the locations of data to be removed from the baseband video signal. Such an embodiment assumes the preknowledge by the terminal 155c of what lines the in-band video data is located on by means of a previously transmitted transaction. Referring to FIG. 5c, demodulating and descrambling circuitry 404 under control of data and control circuit 402 recovers the data by first determining the analog level of a pedestal signal provided at levels not exceeding 70–100 IRE depending on the predetermined line at which the data appears. The demodulating and descrambling circuitry 404 includes a data slicer for determining bipolar data at more than half the pedestal value or levels less than half, or 35–50 IRE, and outputting a demodulated data signal for storage in a data buffer such as a DRAM 418.

Referring to FIG. 5b, the demodulating and descrambling circuitry restores the baseband video signal by regenerating equalizing pulses or other removed pulses, removed at the headend 100, and replacing them in the baseband video signal output to on screen control circuit 406. A circuit similar to digitized pulse generator 216 may be used for generating special pulses such as equalizing pulses and/or the video multiplexer 225 of FIG. 3 may be used for generating a composite waveform. Of course, the data and control circuit 402 operates in accordance with instructions from microprocessor 420. Microprocessor 420, responsive to data received earlier and stored in memory, only decodes those lines which have been predetermined at the headend system control computer 120 to contain in-band video data. The data and control circuit 402 does not attempt to process lines of the vertical blanking interval, for example, utilized for pass-through services such as line 21 captioning data.

In a third embodiment, it may be necessary to determine the presence of in-band video data according to the embodiment of FIGS. 4a and 4b, that is, via the predetermined data pattern and avoid pass through data at predetermined lines such as captioning data on line 21 by predisposing the terminal 155c to ignore data on certain predetermined lines. Still other embodiments for in-band video data recovery may likewise come to mind from consideration of the above-described embodiments.

For horizontal blanking interval transmission and referring to FIG. 6a, the horizontal pulse comprises an approximately five microsecond duration. Furthermore, data may be transmitted in the so-called back porch and prior to the color burst. The beginning of horizontal synch may be identified by a brief, one microsecond, horizontal pulse at −40 IRE. Assuming a pedestal of one microsecond following the determination of the beginning of synch, there is left a remainder of three to five microseconds for transmitting approximately 12–20 bits of data before the color burst and a brief one or two microseconds following the color burst for another 4–8 bits. Techniques for determining if a horizontal pulse is present or data may be initiated by determining the beginning of horizontal as discussed above in connection with FIGS. 4a and 4b. Thereafter, a pedestal gate may be immediately established to determine if pedestal is present or a continuous horizontal pulse. Then, a first three to five microsecond data window may be initiated prior to the color burst for data recognition and checking if the determination is that data is being transmitted in the horizontal blanking interval. Five to eight lines of three to five bytes each may form the equivalent of a twenty-five byte transaction. Referring briefly to FIG. 7, in-band video data via the horizontal blanking interval may be utilized for Type A or B transactions or even types C, D, or E transactions of longer length if certain groups of lines are predetermined for such transactions. The omitted horizontal pulse portions and back porch may be replaced by a digitized pulse generator 216 or a multiplexer per FIG. 3 of terminal 155c. Such a circuit is most conveniently a portion of demodulating and descrambling circuitry 404.

For encoding in-band video data, the reverse operation occurs at scrambler 104f or data inserter 107a according to the present invention. The baseband video signal of FIG. 5a is processed according to instructions received from system control computer 120 at scrambler microprocessor 212 as to which lines are to be utilized for in-band video data transmission. As described earlier, the system control computer 120 controls scrambler operation via the headend controller 130. Because of the operation of the video multiplexer of FIG. 3, the switching off of active video or the baseband video input signal is concurrent with the insertion of data pulses. There need not be a two step process of first removing equalizing pulses at selected lines, such as lines 7–9, as shown in FIG. 5b, although a two step process may be performed by logic circuitry as is well known in the art prior to data insertion.

Lines 7–9 of the vertical blanking interval of an NTSC standard television signal comprises three times 63.5 microseconds duration or approximately 190 microseconds. Equalizing pulses synchronous with the line rate consume six times approximately 2.5 microseconds or fifteen microseconds duration; consequently, some 180 microseconds remain. A pedestal for data slicing need only comprise a one to five microsecond burst still leaving 150–175 microseconds for in-band video data, even if only 50 microseconds worth of data are transmitted per line as shown in FIG. 6a. A pedestal frequency burst at the data rate may be repeated for each line or transmitted only once per field, if all six equalizing pulses are removed. The purpose of the pedestal is to provide a data slicing level if the in-band video data is pulse amplitude modulated. Consequently, a pedestal value is required for providing a new data slicing level if the maximum pulse amplitude changes from 100 IRE to 80 IRE or 70 IRE depending on the selected line. Other forms of data transmission of in-band video data may be utilized according to the present invention including but not limited to pulse duration modulation and pulse code modulation. More than lines 7–9 may be utilized; in fact, any of lines 1–3 and 7–20 of the vertical blanking interval may be utilized so long as active video and required data transmission is permitted unimpaired.

The horizontal blanking interval may similarly be utilized for in band video transmission. A brief one microsecond pulse at −40 IRE may be utilized to signal the beginning of horizontal. Thereafter, a pedestal level may follow and a data window consistent with the principles of FIGS. 6a to 6c established for data recognition as discussed earlier.

Referring now to FIG. 7, there is shown a table showing data transaction formats for in-band video, in-band audio and out-of-band data transmission. The depicted formats are exemplary only and may be modified as appropriate for particular data transmission requirements and transactions as required. The chart depicts a plurality of transaction types, which may be identified as types A–E, by way of example, having different lengths. Transaction type A is of finite length and may be considered to comprise a data packet of a plurality of bytes in particular sequence and including at least a portion of one data stream as described above which may have a transaction code associated therewith. One exemplary range for transaction type A is 8–24 bytes.

For in-band video data, a frequency burst pedestal at a value less than or equal to 70–100 IRE precedes the data and establishes a data slicing value at half the detected level or 35–50 IRE. A preamble may be utilized to identify the start of data. Time/address data may be provided in the alternative in one data slot of the data packet, the time for providing time of day updating of a real time clock of the terminal and the address being used, when necessary, to identify the addressed terminal. Updating terminals using a time of day transaction is particularly described in U.S. Pat. No. 4,994,908, incorporated herein by reference.

A transaction code or operand provides a command or instruction that the terminal is to follow. The depicted data is for operation according to the operand or transaction code. For example, the data may comprise a list of scrambled channels and the operand or transaction code signal the storage of a new list of scrambled channels in terminal memory. Error detection and/or correction (or redundant transmission) or other error checking techniques are utilized to assure data accuracy and reduce bit error rate according to well known techniques such as a cyclic redundancy check.

A bits high check indicator is shown for in-band audio to solve a problem uncovered with in-band audio data transmission where a timing pulse can create artifacts that can be confused with a data pulse transmitted on the sound carrier. It is suggested according to the present invention that a bits high count be used to alleviate the problem.

A field flag can identify whether the data is in an odd or even field. The field flag is used, most conveniently in in-band audio data transmission to signal differences in the expected transactions between odd and even fields. The scrambling mode can tell the demodulating and descrambling circuit what mode of scrambling has been applied to the tuned channel. Other data not listed includes facsimile, teletext, a second captioning language or captioning data, program channel guide (data stream (7) or (8)) and other new service data (sent over data stream (9).

If data transaction type A has a length of M bytes, then, a transaction type B may be indicated as having a length of N bytes. Transaction type B is a longer transaction, for example, for identifying a scrambled channel list. It may be conveniently related to transaction type A by a factor, for example, 1.5–2. As shown Transaction Type B has a length of, for example, 12–36 bytes.

Still longer transaction may be Type C having a length 2–4.5 times the length of Transaction Type B. These transaction may involve even longer streams of data such as channel tuning data.

Transaction Type D may be the equivalent of three Type A transactions or two Type B transaction. On the other hand, Transaction Type D may have only one transaction code despite its length. For example, transaction type D may signal the storage of a channel program guide for display.

Still longer transaction codes may be contemplated for new services such as Type E and so on. These transactions will have predetermined data format and may be the equivalent of multiples of Type A and/or Type B transactions. The relationship among transaction types may be thus defined. If a Type A transaction is said to comprise M bytes and a Type B transaction N bytes, then, other types of longer transactions should maintain a commonality determined by M or N and or a factor of two. For example, a Type D transaction may be one long transaction having one transaction code or comprise three Type A transactions or two Type B transactions. The commonality promotes ease of decoding and storage at a subscriber terminal such as terminal 155c, especially if the terminal is predetermined to look for the several parameters listed in FIG. 6 in predetermined order.

In-band audio data is known in which one bit is transmitted each video line or at a rate of 262 or 263 lines per field less the duration of the vertical synchronizing interval. The bit rate is thus limited in such systems further because certain data slots are reserved for transmittal of certain timing information required for descrambling in a so-called dynamic synch suppression system. The comment in the In-band Audio column for Type E Transaction length reflects this limitation. Yet, in certain embodiments of the present invention, the data rate may be appropriately increased to permit long transactions as long as Type E or even longer.

One purpose of establishing predetermined data formats is to permit ease of decoding and data storage. For example, in-band video data at comparatively high data rates may be decoded and stored in similar manner to the retrieval of slower in-band audio data or out-of-band data which may be at yet another bit rate.

Moreover, at the headend, the system control computer 120 or headend controller 130 may format a transaction of a type according to FIG. 7 so that, once formatted, the transaction, once formatted, need not be reformatted for transmission via any one of the three modes of data transmission described herein: in-band audio, in-band video, or out-of-band data transmission.

Thus, there has been shown and described a data transmission method and apparatus which satisfies the objects of the present invention. Deviations therefrom may be apparent to those of ordinary skill from the above detailed description of the drawings. All patent applications and issued patents cited herein shall be deemed to be incorporated herein by reference as to essential subject matter.

We claim:

1. Data transmission apparatus for a television system comprising a system controller for formatting a plurality of transactions to be transmitted to subscriber terminals, the transactions to be transmitted comprising in-band video data, in-band audio data and out-of-band data, at least one in-band data inserter for transmitting data in a predetermined video channel comprising an audio carrier and a video picture carrier and an out-of-band data transmitter for transmitting out-of-band data, the transactions being of different types and having variable lengths, a first type of transaction having at least one transaction code and comprising a predetermined number of bytes between twelve and thirty-six where the predetermined number is M, a second type of transaction comprising a predetermined number of bytes between sixteen and forty-eight where the predetermined number is N, and a third type of transaction comprising a predetermined number of bytes between twenty-four and seventy-two, where the predetermined number of bytes is a multiple of M or N.

2. The data transmission apparatus according to claim 1, wherein said second predetermined number of bytes is 1.5 to 2 times greater than said first predetermined number of bytes.

3. The data transmission apparatus according to claim 1, wherein M and N are even numbers.

4. The data transmission apparatus according to claim 1, wherein N is greater than M.

5. The data transmission apparatus according to claim 4, wherein the predetermined number of bytes of the third transaction type ranges from 2M to 8N.

6. The data transmission apparatus according to claim 1, wherein the transactions includes a fourth type of transaction comprising a predetermined number of bytes, the predetermined number of bytes being a multiple of M or N and being greater than the predetermined number of bytes of the third type of transaction.

7. The data transmission apparatus according to claim 6, wherein the predetermined number of bytes for the fourth transaction type ranges from 2M to 8N, where N is greater than M.

* * * * *